(12) United States Patent
Iino

(10) Patent No.: US 7,756,069 B2
(45) Date of Patent: Jul. 13, 2010

(54) COMMUNICATION SYSTEM, WIRELESS LAN BASE STATION CONTROLLER, AND WIRELESS LAN BASE STATION DEVICE

(75) Inventor: Satoshi Iino, Tokyo (JP)

(73) Assignee: Panasonic Corporation, Kadoma-shi (JP)

( * ) Notice: Subject to any disclaimer, the term of this patent is extended or adjusted under 35 U.S.C. 154(b) by 503 days.

(21) Appl. No.: 11/719,045

(22) PCT Filed: Aug. 23, 2005

(86) PCT No.: PCT/JP2005/015287

§ 371 (c)(1),
(2), (4) Date: May 10, 2007

(87) PCT Pub. No.: WO2006/051638

PCT Pub. Date: May 18, 2006

(65) Prior Publication Data

US 2008/0069024 A1    Mar. 20, 2008

(30) Foreign Application Priority Data

Nov. 12, 2004    (JP)    ............................. 2004-329063

(51) Int. Cl.
    *H04W 4/00*    (2009.01)
(52) U.S. Cl. ........................ 370/313; 370/328; 370/338
(58) Field of Classification Search ........................ None
    See application file for complete search history.

(56) References Cited

U.S. PATENT DOCUMENTS

| 7,016,948 B1 * | 3/2006 | Yildiz ........................ 709/221 |
| 2003/0036404 A1 * | 2/2003 | Adachi et al. ............... 455/522 |

FOREIGN PATENT DOCUMENTS

| JP | 11-136257 A | 5/1999 |
| JP | 2003-318816 A | 11/2003 |
| JP | 2004-312257 A | 11/2004 |

OTHER PUBLICATIONS

PCT International Search Report dated Nov. 1, 2005.

(Continued)

*Primary Examiner*—Erika A Gary
(74) *Attorney, Agent, or Firm*—Christensen O'Connor Johnson Kindness PLLC

(57) ABSTRACT

A communication system, wireless LAN base station controller, and a wireless LAN base station device for efficiently communicating a broadcast frame or multicast frame through a downstream channel. The communication system (10) comprises an AP controller (100) and a wireless LAN base station device (200). A frame converting section (102) of the AP controller (100) performs conversion into a 802.11 frame according to the network-side tunnel header of the downstream broadcast or multicast frame, and a tunnel creating/managing section (103) creates a tunnel header having a destination MAC address which is a broadcast or multicast address, and encapsulates the 802.11 frame by the tunnel header. A tunnel creating/managing section (202) of the wireless LAN base station device (200) adds the BSSID of the wireless LAN base station device (200) to the header of the 802.11 frame from which the tunnel header is removed, and terminal-side input/output section (204) sends the 802.11 frame with the BSSID.

7 Claims, 21 Drawing Sheets

OTHER PUBLICATIONS

Calhoun, P., et al., "Light Weight Access Point Protocol (LWAPP)," Internet-Draft: draft-ohara-capwap-lwapp-00, Network Working Group, Internet Engineering Task Force (IETF), The Internet Society, May 8, 2004, 60 pages.

Notice of the Reasons for Rejection mailed Apr. 13, 2010, issued in corresponding Japanese Application No. 2004-329063.

* cited by examiner

| index | TERMINAL IDENTIFIER | BSSID |
|---|---|---|
| 1 | T1 | A-1 |
| 2 | T2 | B-1 |
| 3 | T3 | A-1 |
| 6 | T6 | C-1 |
| .. | .. | .. |

FIG.3B

| index | BSSID | TUNNEL IDENTIFIER | |
|---|---|---|---|
| | | DESTINATION MAC ADDRESS | TRANSMISSION SOURCE MAC ADDRESS |
| 1 | A-1 | X | S |
| 2 | B-1 | Y | S |
| 3 | C-1 | Z | S |
| .. | .. | .. | .. |

| index | BSSID | TUNNEL IDENTIFIER | |
|---|---|---|---|
| | | DESTINATION MAC ADDRESS | TRANSMISSION SOURCE MAC ADDRESS |
| 1 | A-1 | S | X |

FIG.7B

| index | TERMINAL IDENTIFIER | BSSID |
|---|---|---|
| 1 | T1 | A-1 |
| 2 | T3 | A-1 |
| .. | .. | .. |

FIG.14A

| TUNNEL ID | BSSID | TUNNEL IDENTIFIER ||| TUNNEL GROUP IDENTIFIER |
|---|---|---|---|---|---|
| | | DESTINATION MAC ADDRESS | TRANSMISSION SOURCE MAC ADDRESS | VLAN TAG ID | |
| 1 | A-1 | X | S | #100 | #100 |
| 2 | A-2 | X | S | #200 | #200 |
| 3 | B-1 | Y | S | #100 | #100 |
| 4 | B-2 | Y | S | #300 | #300 |
| 5 | C-1 | Z | S | #200 | #200 |
| 6 | C-2 | Z | S | #300 | #300 |
| .. | .. | .. | .. | .. | .. |

FIG.14B

| index | TUNNEL IDENTIFIER | TUNNEL ID |
|---|---|---|
| 1 | T1 | 1 |
| 2 | T2 | 4 |
| 3 | T3 | 6 |
| 4 | T4 | 1 |
| 5 | T5 | 4 |
| 6 | T6 | 2 |
| .. | .. | .. |

FIG.14C

| index | NETWORK IDENTIFIER | TUNNEL GROUP IDENTIFIER |
|---|---|---|
| 1 | 1 | #100 |
| 2 | 2 | #200 |
| 3 | 3 | #300 |
| .. | .. | .. |

| TUNNEL ID | BSSID | TUNNEL IDENTIFIER | | | TUNNEL GROUP IDENTIFIER |
| --- | --- | --- | --- | --- | --- |
| | | DESTINATION MAC ADDRESS | TRANSMISSION SOURCE MAC ADDRESS | VLAN TAG ID | |
| 1 | A-1 | S | X | #100 | #100 |
| 2 | A-2 | S | X | #200 | #200 |

FIG.18

COMMUNICATION SYSTEM, WIRELESS LAN BASE STATION CONTROLLER, AND WIRELESS LAN BASE STATION DEVICE

CROSS REFERENCES TO RELATED APPLICATIONS

The present application is a national stage entry from PCT Application No. JP0515287, which claims priority to Japanese Patent Application No. 2004-329063, filed Nov. 12, 2004, the content of which is incorporated herein by reference.

TECHNICAL FIELD

The present invention particularly relates to a communication system according to a wireless LAN, a wireless LAN base station control apparatus and a wireless LAN base station apparatus configuring the communication system.

INDUSTRIAL APPLICABILITY

The communication system, the wireless LAN base station control apparatus and the wireless LAN base station control apparatus and the wireless LAN base station apparatus according to the present invention have the advantages of capable of carrying out efficient communication when a broadcast frame or multicast frame is communicated in downlink and is particularly effective for use in a wireless LAN communication system, access point control apparatus and access points that configure the wireless LAN communication system.

BACKGROUND ART

In recent years, with the widespread use of a wireless LAN (IEEE802.11 standard), a large-scale wireless LAN network system is being increasingly built in a public network and corporate network. Accordingly, it is studied to shift from a method of installing access points (AP), for example, setting and installing wireless LAN base station apparatuses individually to a method whereby an AP control apparatus connected to a plurality of wireless LAN base station apparatuses, for example, a wireless LAN base station control apparatus performs automatic settings, failure management, collection of statistical information of the wireless LAN base station apparatuses collectively. Such a study is being conducted by IETF (Internet Engineering Task Force) which is an international standardization organization and IEEE802.11 working group or the like, and the planning of the standardization is underway.

Consequently, it is studied to perform bridge processing between a wireless LAN frame (802.11 standard) and an Ethernet (registered trademark) frame by a higher AP control apparatus instead of the wireless LAN base station apparatuses, and an architecture is studied in which opening/closing ports for authentication are also shifted from the wireless LAN base station apparatuses to the AP control apparatus. In such an architecture, the CAPWAP working group of IETF proposes an LWAPP (light weight access protocol) as one of protocols for managing APs. According to this LWAPP, the AP control apparatus performs control such as automatic setting of setting information, failure management, statistical information collection and setting of encryption key information on the wireless LAN base station apparatuses.

The communication system proposed here specifies communication using an Ethernet (registered trademark) tunnel between the AP control apparatus and the wireless LAN base station apparatuses to perform this control (see Non-Patent Document 1). This Ethernet (registered trademark) tunnel is determined by a set of transmission source MAC address and destination MAC address. The LWAPP describes that the MAC address of the transmission source interface is set as the transmission source MAC address of the Ethernet (registered trademark) tunnel, and the MAC address of the destination interface is set as the destination MAC address.

Conversion between a WLAN frame of user traffic and an Ethernet (registered trademark) frame is performed at an AP in a general wireless LAN system. However, as the LWAPP includes description of "Centralization of the bridging", the conversion between the WLAN frame and the Ethernet (registered trademark) frame is performed at the AP control apparatus in a centralized manner, and the WLAN frame (hereinafter, referred to as an 802.11 frame) is encapsulated with an Ether header and communicated between the AP and the AP control apparatus. In this case, the AP does not perform any complicated work such as header conversion and only removes encapsulation for the communication terminal, that is, only removes the Ether header and transmits the frame to the terminal side. Furthermore, as for the frame to be transmitted from the communication terminal to the reception network side, the 802.11 frame is only encapsulated with the Ether header and transmitted to the network side, and therefore there is a merit that processing of the AP becomes quite simple.

Non-Patent Document 1: IETF draft draft-ohara-capwap-lwapp-00.txt "Light Weight Access Point Protocol"

DISCLOSURE OF INVENTION

Problems to be Solved by the Invention

However, in a conventional communication system, the AP control apparatus performs all conversion between the Ethernet (registered trademark) frame and the 802.11 frame, and this involves the following problems.

The Ether header has two addresses; destination MAC address and transmission source MAC address. On the other hand, the 802.11 header in a frame exchanged between the AP and the communication terminal has three addresses (suppose these addresses are Add1, Add2 and Add3). In the 802.11 frame transmitted from the AP to the communication terminal, the MAC address of the communication terminal is inputted to Add1, BSSID which is an identifier of the AP is inputted to Add2, and the transmission source MAC address is inputted to Add3.

Therefore, when the Ethernet (registered trademark) frame is converted to the 802.11 frame, the AP control apparatus must add a BSSID to the frame. When a broadcast frame is received from the network side, the AP control apparatus must transmit the broadcast frame to all APs under the AP control apparatus, make the same number of copies of the frame as APs, convert them to 802.11 frames via the respective APs, encapsulate the outside thereof with the Ethernet (registered trademark) header addressed to the respective APs and transmit the broadcast frames. The burden with this processing increases in accordance with an increase in the number of APs managed by the AP control apparatus. Furthermore, when a plurality of BSSIDs are assigned to the APs, it is necessary to copy a greater number of frames than the number of managed APs, which becomes a great burden. That is, in the conventional communication system, when a broadcast frame is communicated in downlink, it is hard to say that efficient communication is carried out.

It is therefore an object of the present invention to provide a communication system, wireless LAN base station control apparatus and wireless LAN base station apparatus capable of carrying out efficient communication when a broadcast frame or multicast frame is communicated in downlink.

Means for Solving the Problem

The communication system according to the present invention adopts a configuration provided with: a wireless LAN base station control apparatus including: a frame conversion section that forms a wireless LAN header based on a header of a data link layer of a received downlink broadcast frame or multicast frame and converts the broadcast frame or multicast frame to a wireless LAN frame; a frame formation section that forms a transmission header whose destination address is a broadcast address or a multicast address and encapsulates the wireless LAN frame with the transmission header; and a transmission section that transmits the frame formed by the frame formation section; and a wireless LAN base station apparatus including: a header modification section that adds a BSSID assigned to the wireless LAN base station apparatus to a header part of the wireless LAN frame obtained by removing the transmission header from the received frame; and a wireless LAN frame transmission section that transmits the wireless LAN frame with the BSSID added to the header part.

The wireless LAN base station control apparatus of the present invention adopts a configuration including: a frame conversion section that forms a wireless LAN header based on a header of a data link layer of a received downlink broadcast frame or multicast frame and converts the broadcast frame or multicast frame to a wireless LAN frame; a frame formation section that forms a transmission header whose destination address is a broadcast address or a multicast address and encapsulates the wireless LAN frame with the transmission header; and a transmission section that transmits the frame formed by the frame formation section.

The wireless LAN base station apparatus of the present invention adopts a configuration including: a header modification section that adds a BSSID assigned to the wireless LAN base station apparatus to a header part of a wireless LAN frame obtained by removing a transmission header from a frame transmitted from a wireless LAN base station control apparatus to which the transmission header whose destination address is a broadcast address or a multicast address is added; and a wireless LAN frame transmission section that transmits the wireless LAN frame with the BSSID added to the header part.

Advantageous Effect of the Invention

According to the present invention, it is possible to provide a communication system, a wireless LAN base station control apparatus and a wireless LAN base station apparatus capable of carrying out efficient communication when a broadcast frame or a multicast frame is communicated in downlink.

BRIEF DESCRIPTION OF DRAWINGS

FIG. 3 illustrates a table stored in the tunnel management database section in FIG. 2;

FIG. 7 illustrates a table stored in the tunnel management database section in FIG. 6;

FIG. 14 illustrates a table stored in the tunnel management database section in FIG. 13;

FIG. 18 illustrates a table stored in the tunnel management database section in FIG. 17;

BEST MODE FOR CARRYING OUT THE INVENTION

Figure 1:
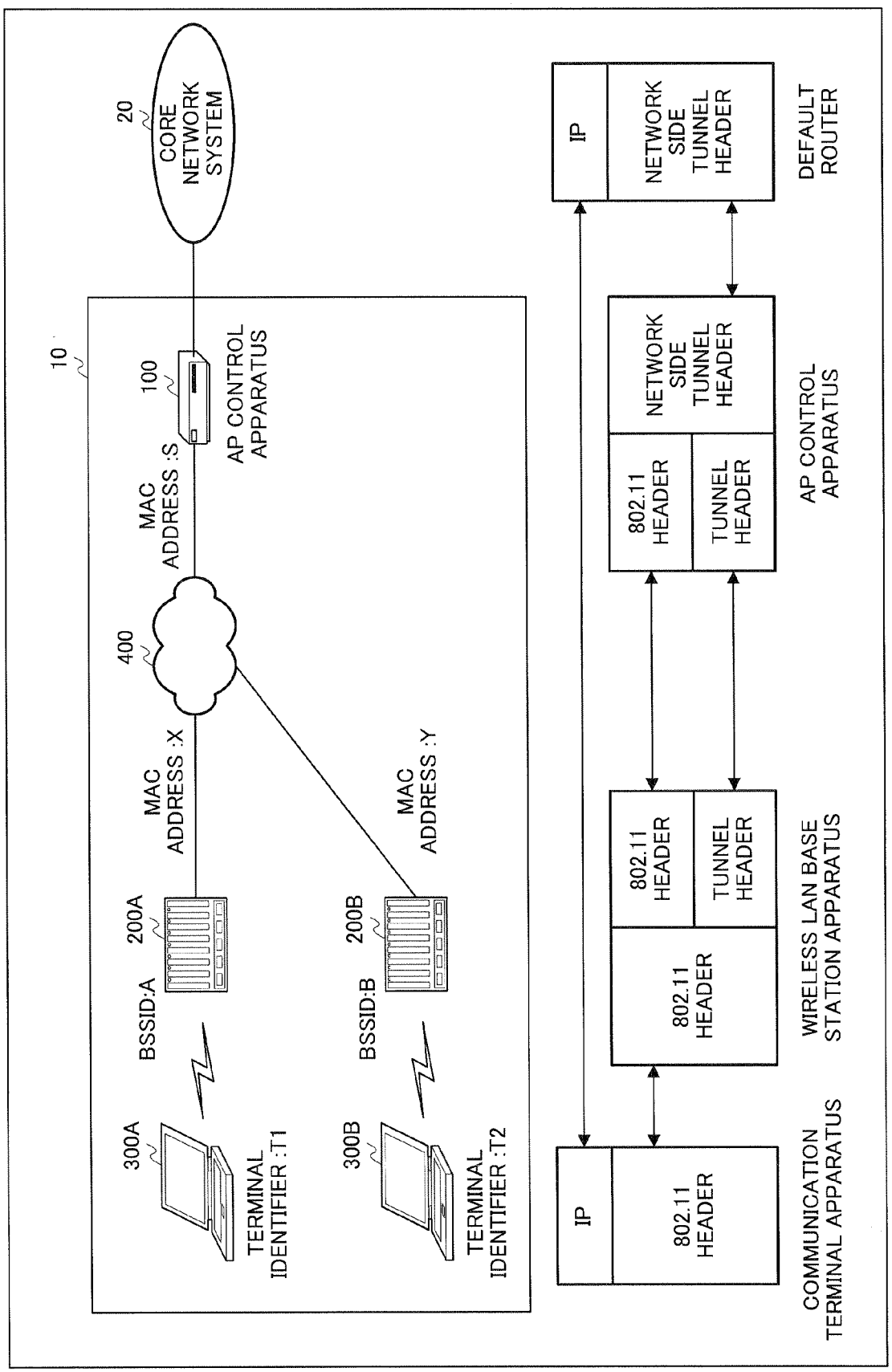
FIG. 1 illustrates an overall configuration of a communication system and protocol stacks according to Embodiment 1 of the present invention.

Hereinafter, embodiments of the present invention will be described in detail with reference to the accompanying drawings. In the respective embodiments, components that are the same will be assigned the same reference numerals, and explanations thereof will be omitted to avoid overlapping.

Embodiment 1

First, the configuration of a communication system according to this embodiment will be explained with reference to FIG. 1.

As shown in FIG. 1, communication system 10 according to Embodiment 1 is provided with: wireless LAN base station apparatus 200; AP control apparatus 100 as a wireless LAN base station control apparatus that forms a data tunnel defined, that is, determined by a base station MAC address of wireless LAN base station apparatus 200 and a control station MAC address of AP control apparatus 100 between AP control apparatus 100 and wireless LAN base station apparatus 200 and performs communication using this data tunnel; communication terminal 300 that accesses wireless LAN base station apparatus 200 to perform communication; and network system 400. AP control apparatus 100 is connected to core network system 20.

MAC address: S is assigned to an interface of AP control apparatus 100 on the wireless LAN base station apparatus 200 side. Furthermore, MAC address: X is assigned to an interface of wireless LAN base station apparatus 200A on the AP control apparatus 100 side. Communication between AP control apparatus 100 and wireless LAN base station apparatus 200A is carried out through a data tunnel which is defined by MAC address: X and MAC address: S. Communication between AP control apparatus 100 and wireless LAN base station apparatus 200B is carried out through a data tunnel which is defined by MAC address: Y and MAC address: S.

Communication between wireless LAN base station apparatus 200A and communication terminal 300A is carried out using BSSID (Basic Service Set ID): A as an identifier. Communication between wireless LAN base station apparatus 200B and communication terminal 300B is carried out using BSSID (Basic Service Set ID): B as an identifier. Furthermore, terminal identifier T1 is given to communication terminal 300A, and terminal identifier T2 is given to communication terminal 300B.

As shown in FIG. 1, when a downlink frame is transmitted through a default router located in core network system 20, AP control apparatus 100 receives a frame to which a "tunnel header" is added (hereinafter referred to as "network side tunnel header" and is distinguished from a tunnel header used between AP control apparatus 100 and wireless LAN base station apparatus 200). When core network system 20 is an Ethernet (registered trademark), the network side tunnel header is an Ether header.

Using the network side tunnel header, AP control apparatus 100 creates a tunnel header to be used between AP control apparatus 100 and wireless LAN base station apparatus 200 and an 802.11 header to be used upon transmitted from wireless LAN base station apparatus 200 to communication terminal 300, encapsulates an 802.11 frame using the created tunnel header and the 802.11 header and transmits the 802.11 frame to wireless LAN base station apparatus 200.

Upon receiving the frame from AP control apparatus 100, wireless LAN base station apparatus 200 removes the tunnel header, that is, decapsulates the frame and transmits the frame to communication terminal 300.

When the downlink frame is a broadcast frame, AP control apparatus 100 uses a broadcast address as the destination MAC address of the created tunnel header. Upon receiving the frame from AP control apparatus 100, wireless LAN base station apparatus 200 removes the tunnel header and transmits the frame as an 802.11 frame to communication terminal 300. At this time, wireless LAN base station apparatus 200 overwrites Add2 of the 802.11 frame with the BSSID which is assigned to communication terminal 300 to which data should be transmitted. By so doing, it is possible to transmit the frame to terminals which exist in a broadcast domain under the AP control apparatus. At that time, AP control apparatus 100 need not copy a frame.

Figure 2:
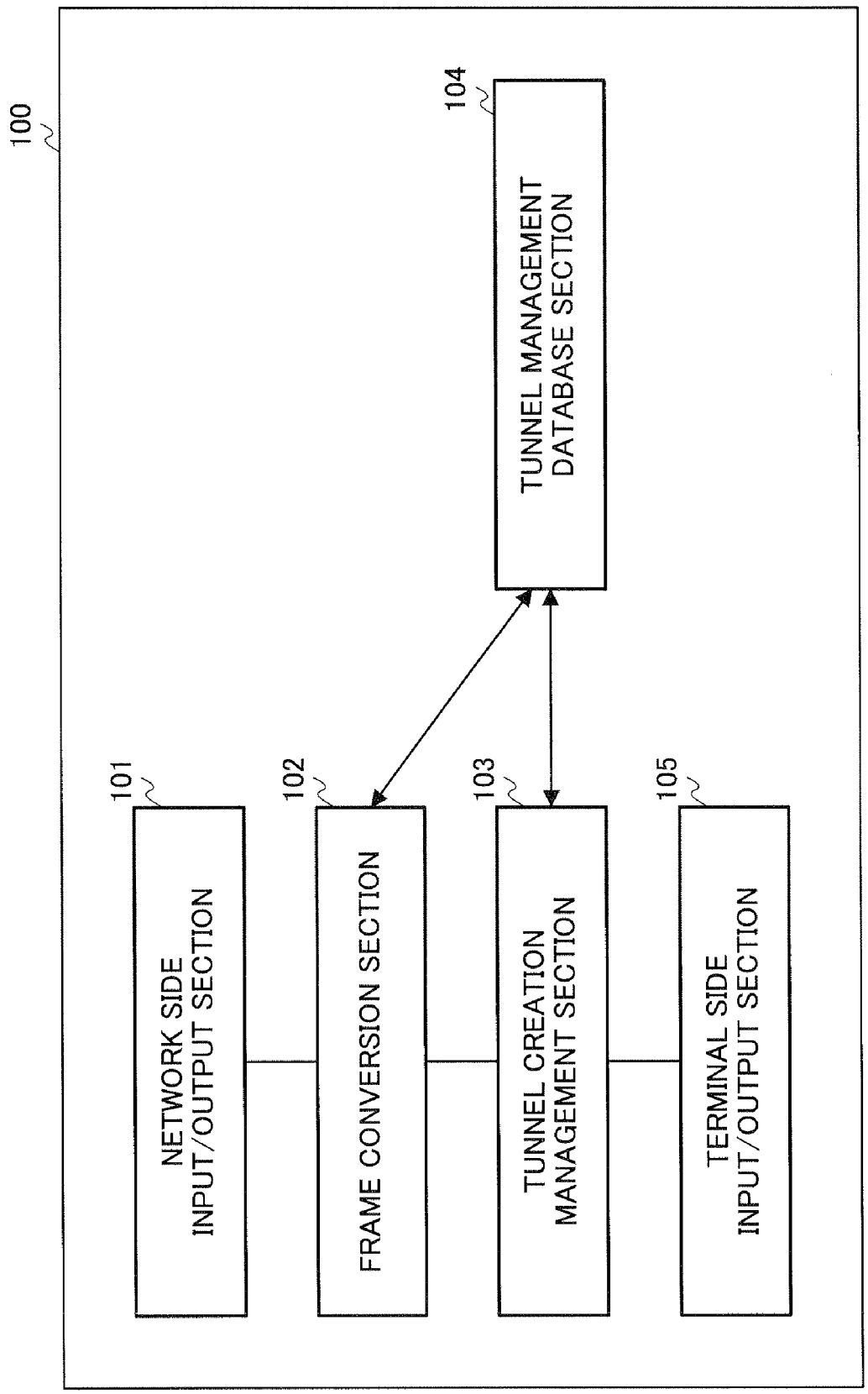
FIG. 2 is a block diagram showing the configuration of the AP control apparatus in FIG. 1.

As shown in FIG. 2, AP control apparatus 100 includes network side input/output section 101, frame conversion section 102, tunnel creation management section 103 as a frame formation section that forms a transmission header whose destination address is a broadcast address or multicast address and encapsulates a wireless LAN frame with the transmission header, tunnel management database section 104 and terminal side input/output section 105.

Network side input/output section 101 inputs/outputs a frame to/from the network side, that is, the core network system 20 side. More specifically, network side input/output section 101 transmits the frame inputted from the core network system 20 side to frame conversion section 102 and also transmits the frame inputted from frame conversion section 102 to core network system 20.

Frame conversion section 102 creates an 802.11 header used upon transmitted from wireless LAN base station apparatus 200 to communication terminal 300 using the network side tunnel header and encapsulates the 802.11 frame with the created 802.11 header. That is, frame conversion section 102 converts a frame.

Tunnel creation management section 103 creates a data tunnel and manages tunnel management database section 104. Furthermore, tunnel creation management section 103 divides inputted frames among data tunnels. At that time, tunnel creation management section 103 creates a tunnel header to add to the frame.

Tunnel management database section 104 is provided with a data frame tunnel table and a data frame correspondence table as shown in FIG. 3.

As shown in FIG. 3A, the data frame tunnel table stores entries of data tunnels to communicate data frames, and each data tunnel is defined (specified) by a set of a destination MAC address and a transmission source MAC address. For example, index 1 of the data frame tunnel table in FIG. 3A defines a data tunnel formed between AP control apparatus 100 and wireless LAN base station apparatus 200A. This data tunnel is then associated with a BSSID used for communication between wireless LAN base station apparatus 200 and communication terminal 300.

The data frame correspondence table defines (specifies) which data tunnel should be used for each data frame as shown in FIG. 3B. When, for example, the identifier of communication terminal 300A is T1, the corresponding BSSID in the data frame correspondence table is A-1, and therefore, when a data frame is exchanged between communication terminal 300A and AP control apparatus 100, the data frame tunnel table defines (specifies) that the data tunnel with index 1 whose BSSID is A-1 is used.

Terminal side input/output section 105 transmits the frame received from tunnel creation management section 103 to wireless LAN base station apparatus 200 and also transmits the frame from wireless LAN base station apparatus 200 to tunnel creation management section 103.

Figure 4:
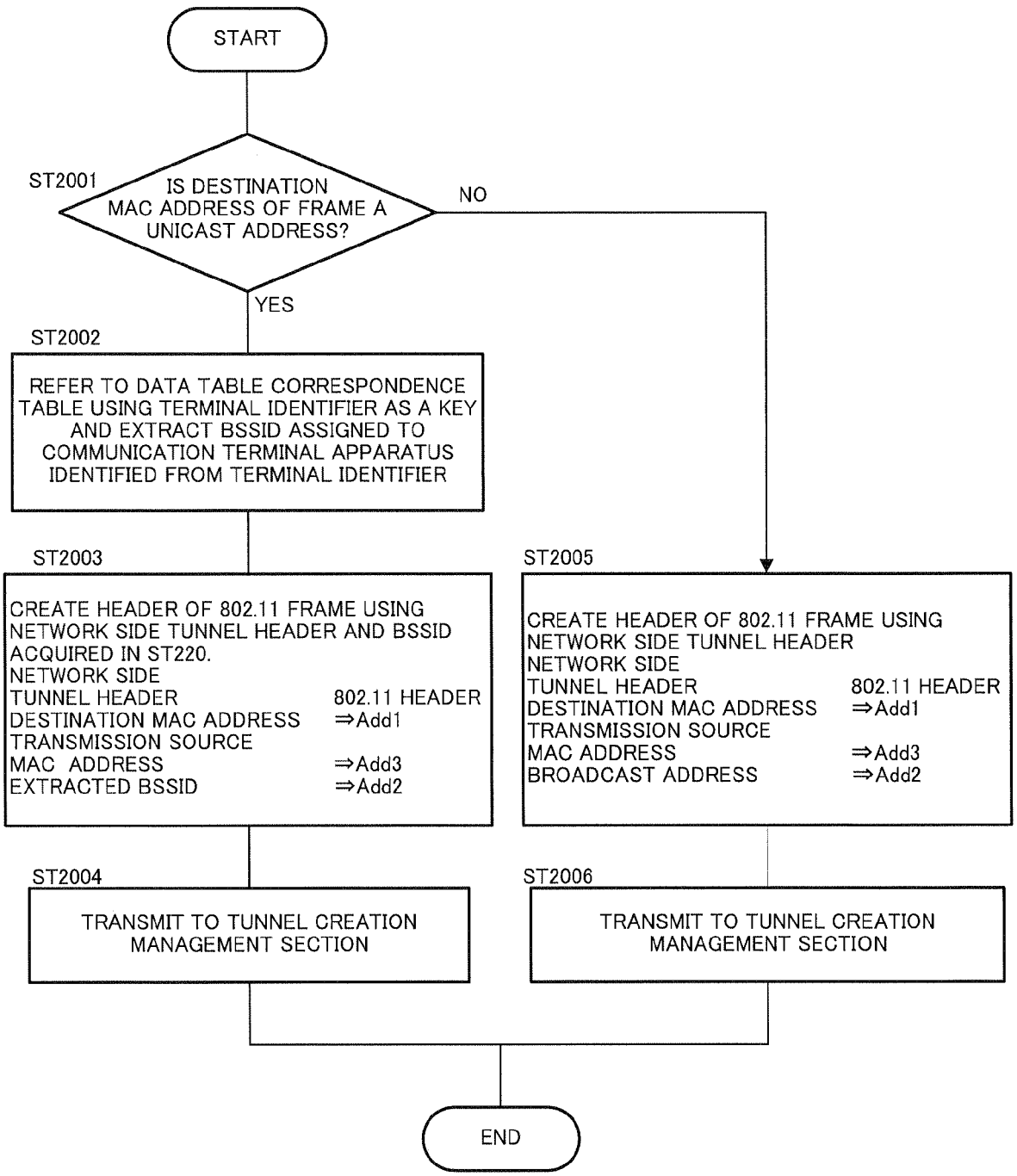
FIG. 4 is a flowchart illustrating the operation of the frame conversion section in FIG. 2.

Next, the operation of frame conversion section 102 will be explained with reference to FIG. 4. FIG. 4 only shows the flow of a downlink frame, that is, a case where frame conversion section 102 receives a frame from network side input/output section 101 as input.

Upon receiving the frame from network side input/output section 101, frame conversion section 102 first decides whether or not the destination MAC address of the frame is a unicast address (step ST2001).

When the decision result shows that the destination MAC address is a unicast address (step ST2001: YES), this unicast address is a terminal identifier of communication terminal 300 to which the frame is transmitted, and therefore frame conversion section 102 refers to the data frame correspondence table in tunnel management database section 104 using this terminal identifier as a key and extracts the BSSID assigned to communication terminal 300 identified from the terminal identifier (step ST2002).

In step ST2003, frame conversion section 102 creates a header of the 802.11 frame using the network side tunnel header added to the frame transmitted from the network side and the BSSID acquired in step ST2002. More specifically, the destination MAC address of the network side tunnel header is inputted to Add1 of the 802.11 frame, the transmission source MAC address of the network side tunnel header is inputted to Add3 of the 802.11 frame, and the BSSID acquired in step ST2002 is inputted to Add2. The configuration of the data frame between AP control apparatus 100 and wireless LAN base station apparatus 200 will be described later with reference to FIG. 9.

In step ST2004, frame conversion section 102 transmits the 802.11 frame to which the header created in step ST2003 is added to tunnel creation management section 103.

Furthermore, when the decision result in step ST2001 shows that the destination MAC address is not a unicast address, that is, when the destination MAC address is a multicast address or the broadcast address (step ST2001: NO), frame conversion section 102 creates the header of the 802.11 frame using the network side tunnel header added to the frame transmitted from the network side (step ST2005). More specifically, the destination MAC address of the network side tunnel header is inputted to Add1 of the 802.11 frame, the transmission source MAC address of the network side tunnel header is inputted to Add3 of the 802.11 frame, and the broadcast address is inputted to Add2. Here, the broadcast address is inputted to Add2 expediently, but as will be described later, wireless LAN base station apparatus 200 overwrites Add2 with the BSSID assigned to wireless LAN base station apparatus 200, and therefore the inputted address is not particularly limited to the broadcast address. Point is that it is only necessary to secure the area of Add2.

In step ST2006, frame conversion section 102 transmits the 802.11 frame to which the header created in step ST2005 is added to tunnel creation management section 103.

Figure 5:
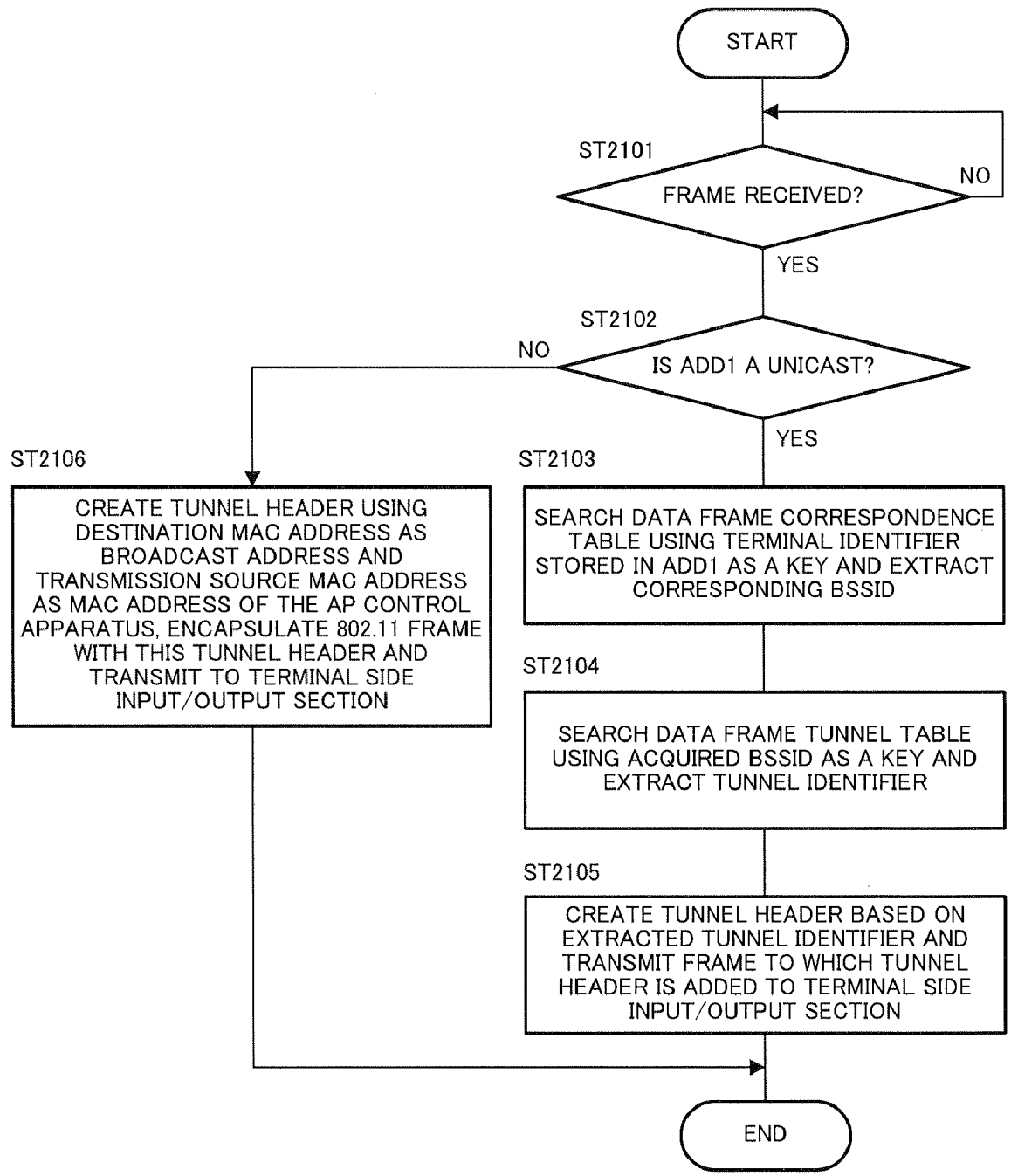
FIG. 5 is a flowchart illustrating the operation of the tunnel creation management section in FIG. 2.

Next, the operation of tunnel creation management section 103 will be explained with reference to FIG. 5. FIG. 5 especially shows the flow of a downlink frame, that is, only the case where tunnel creation management section 103 receives a frame from frame conversion section 102 as input.

First, when receiving a frame in step ST2101, tunnel creation management section 103 judges whether or not Add1 of the frame is a unicast address (step ST2102).

When the decision result in step ST2102 shows that Add1 is a unicast address (step ST2102: YES), tunnel creation management section 103 searches the data frame correspondence table using the terminal identifier stored as the destination MAC address of Add1 as a key and extracts the corresponding BSSID (step ST2103).

In step ST2104, tunnel creation management section 103 searches the data frame tunnel table using the BSSID acquired in step ST2103 as a key and extracts the corresponding tunnel identifier.

In step ST2105, tunnel creation management section 103 creates a tunnel header based on the tunnel identifier extracted in step ST2104 and transmits the frame to which this tunnel header is added to terminal side input/output section 105.

When the decision result in step ST2102 shows that Add1 is not a unicast address, that is, when Add1 is a multicast address or a broadcast address (step ST2102: NO), tunnel creation management section 103 creates a tunnel header taking the destination MAC address as a broadcast address and the transmission source MAC address as the MAC address of AP control apparatus 100, encapsulates the 802.11 frame received from frame conversion section 102 with this tunnel header and transmits the 802.11 frame to terminal side input/output section 105 (step ST2106).

Figure 6:
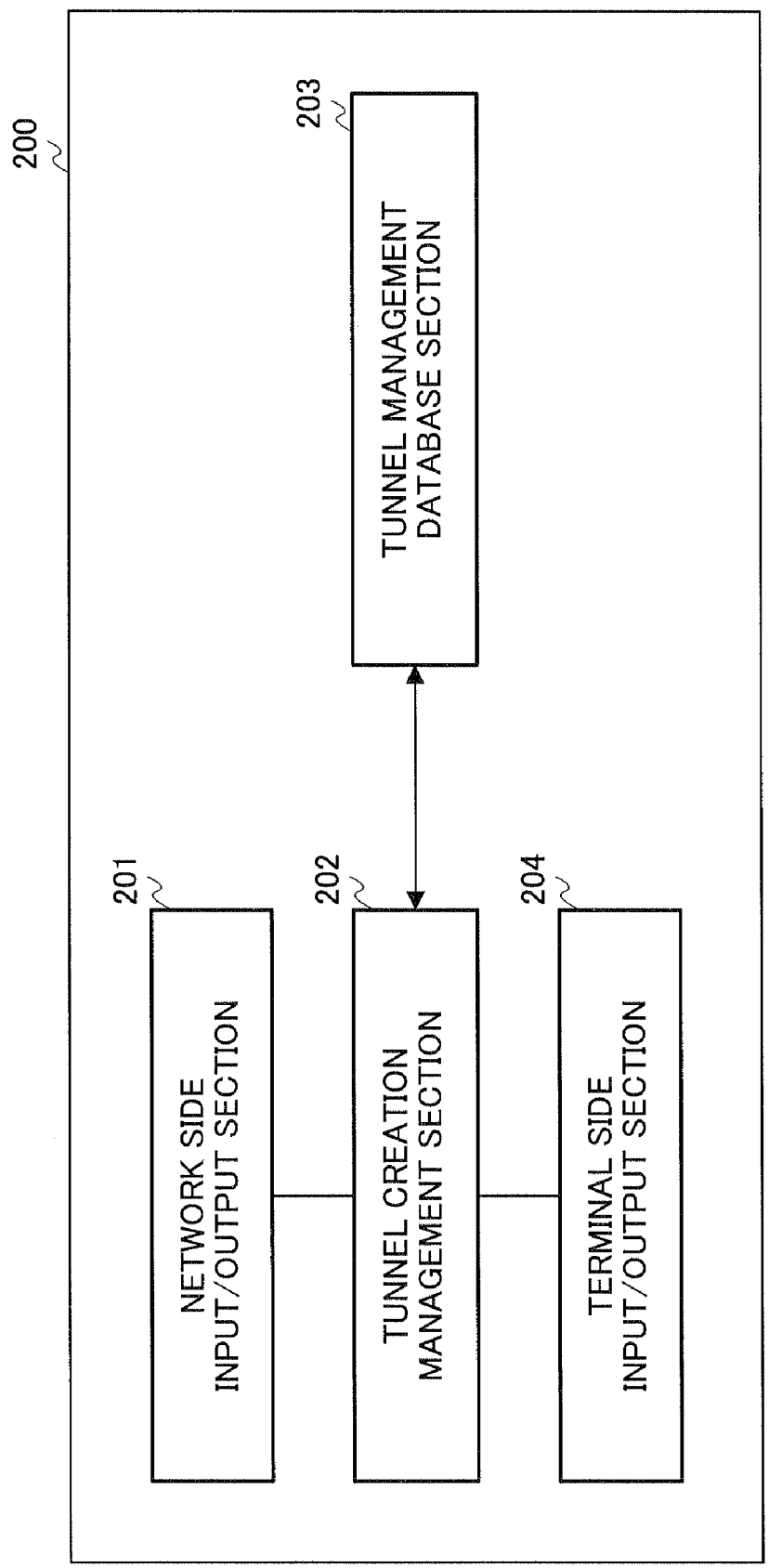
FIG. 6 is a block diagram showing the configuration of the wireless LAN base station apparatus in FIG. 1.

As shown in FIG. 6, wireless LAN base station apparatus 200 has network side input/output section 201, tunnel creation management section 202, tunnel management database section 203 and terminal side input/output section 204.

Network side input/output section 201 inputs/outputs a frame to/from the network side, that is, the AP control apparatus 100 side. More specifically, network side input/output section 201 transmits the frame inputted from the AP control apparatus 100 side to tunnel creation management section 202 and transmits the frame inputted from tunnel creation management section 202 to AP control apparatus 100.

Tunnel creation management section 202 creates a data tunnel and manages tunnel management database section 203 or the like. Furthermore, tunnel creation management section 202 divides the inputted frames among data tunnels. Details of the operation of this tunnel creation management section 202 will be described later.

As shown in FIG. 7, tunnel management database section 203 is provided with a data frame tunnel table and a data frame correspondence table.

As shown in FIG. 7A, the data frame tunnel table stores entries of data tunnels to communicate data frames, and each data tunnel is defined (specified) by a set of a destination MAC address and a transmission source MAC address. For example, index 1 of the data frame tunnel table in FIG. 7A defines a data tunnel which is formed between AP control apparatus 100 and wireless LAN base station apparatus 200A. This data tunnel is then associated with a BSSID used for communication between wireless LAN base station apparatus 200 and communication terminal 300.

The data frame correspondence table defines (specifies) which data tunnel should be used for each data frame as shown in FIG. 7B. When, for example, the identifier of communication terminal 300A is T1, the corresponding BSSID in the data frame correspondence table is A-1, and therefore, when a data frame is exchanged between communication terminal 300A and AP control apparatus 100, the data frame tunnel table defines (specifies) that the data tunnel with index 1 whose BSSID is A-1 is used.

Terminal side input/output section 204 transmits the frame from communication terminal 300 to tunnel creation management section 202 and also transmits the frame from tunnel creation management section 202 to communication terminal 300.

Figure 8:
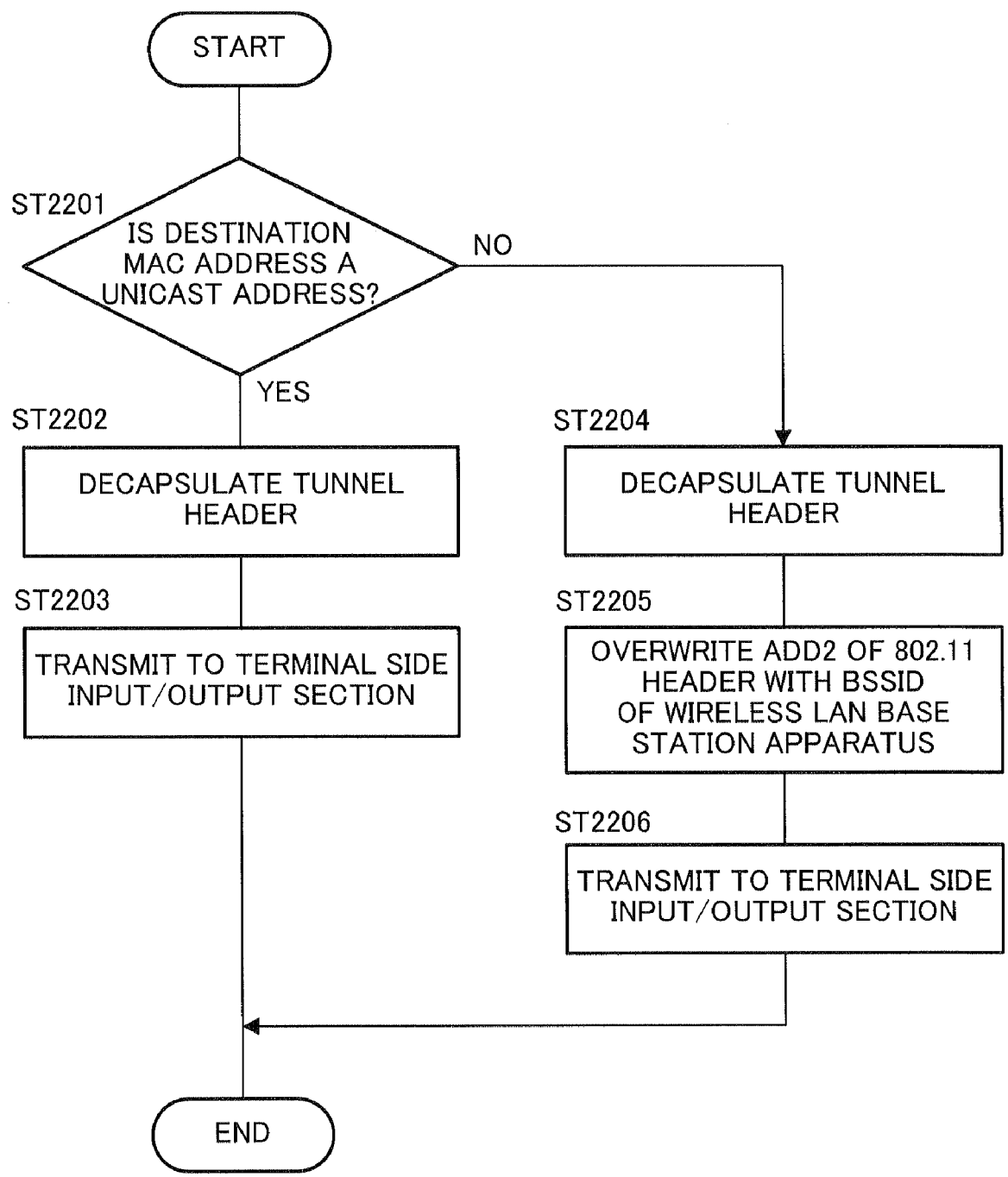
FIG. 8 is a flowchart illustrating the operation of the tunnel creation management section in FIG. 6.

Next, the operation of tunnel creation management section 202 will be explained with reference to FIG. 8. FIG. 8 only shows the flow of a downlink frame in particular, that is, a case where tunnel creation management section 202 receives a frame from network side input/output section 201 as input.

Tunnel creation management section 202 judges whether or not the destination MAC address of the tunnel header of the received frame is a unicast address (step ST2201).

When the decision result shows that the destination MAC address is a unicast address (step ST2201: YES), tunnel creation management section 202 removes the tunnel header, that is, performs decapsulation (step ST2202).

In step ST2203, tunnel creation management section 202 transmits the 802.11 frame obtained by removing the tunnel header to terminal side input/output section 204 (step ST2203).

When the decision result in step ST2201 shows that the destination MAC address is not a unicast address, that is, the destination MAC address is a broadcast address or a multicast address (step ST2201: NO), tunnel creation management section 202 removes the tunnel header, that is, performs decapsulation (step ST2204).

In step ST2205, tunnel creation management section 202 overwrites Add2 of the 802.11 frame obtained by removing the tunnel header with the BSSID assigned to wireless LAN base station apparatus 200.

In step ST2206, tunnel creation management section 202 transmits the 802.11 frame whose header part obtained in step ST2205 is modified to terminal side input/output section 204.

Next, the configuration of a data frame used between AP control apparatus 100 and wireless LAN base station apparatus 200 will be explained with reference to FIG. 9.

Figure 9:
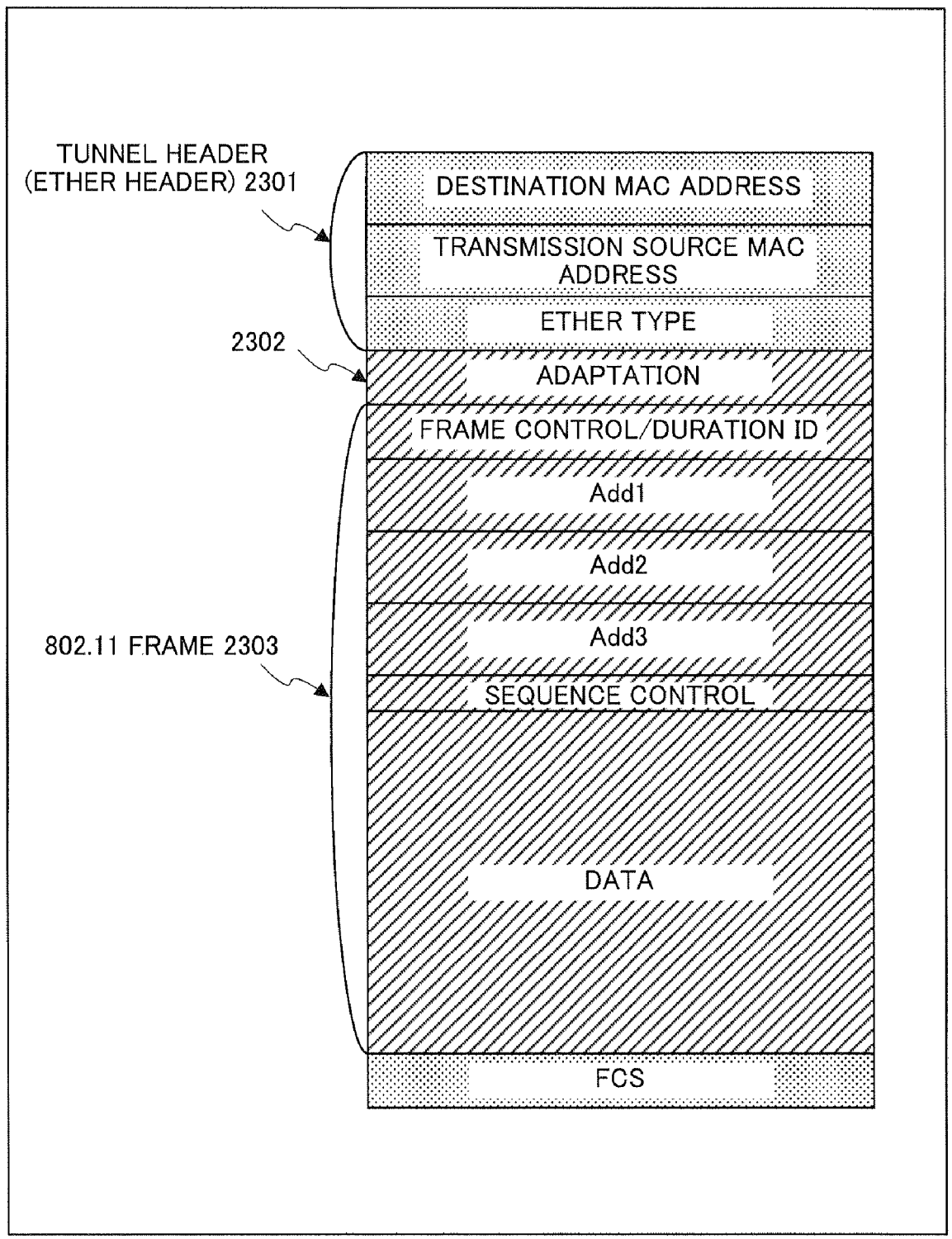
FIG. 9 illustrates the configuration of a data frame.

As shown in FIG. 9, the data frame is provided with tunnel header 2301 (Ether header here), adaptation 2302 and 802.11 frame 2303. Tunnel header 2301 is comprised of a destination MAC address, a transmission source MAC address and an Ether type. A special value should be assigned to the Ether type so as to be identified by the AP control apparatus and the wireless LAN base station apparatus, but the Ether type is not directly related to the present invention, it is not specified here. Furthermore, 802.11 frame 2303 is comprised of a frame control duration ID, an address 1 area (Add1) in which a terminal identifier (terminal identifier of communication terminal 300 in this embodiment) of the destination to which the data frame is transmitted using the 802.11 frame is stored, an address 2 area (Add2) in which a BSSID of wireless LAN base station apparatus 200 is stored, an address 3 area (Add3) in which a transmission source MAC address (MAC address of the communication terminal transmitted through core network system 20 in this embodiment) is stored, a sequence control area and a data area. Furthermore, adaptation (AD) 2302 is an area which becomes a delimiter between the Ether frame and the 802.11 frame. The information stored in above-described addresses 1 to 3 is explained for the case where the information is transmitted from core network system 20 to wireless LAN base station apparatus 200 and communication terminal 300 through AP control apparatus 100, especially the case where the transmitted frame is a unicast frame.

A situation in which frame transmission is carried out in communication system 10 in the above-described configuration will be explained with reference to FIG. 10. Here, especially a situation of transmission of a broadcast frame in downlink is shown.

Figure 10:
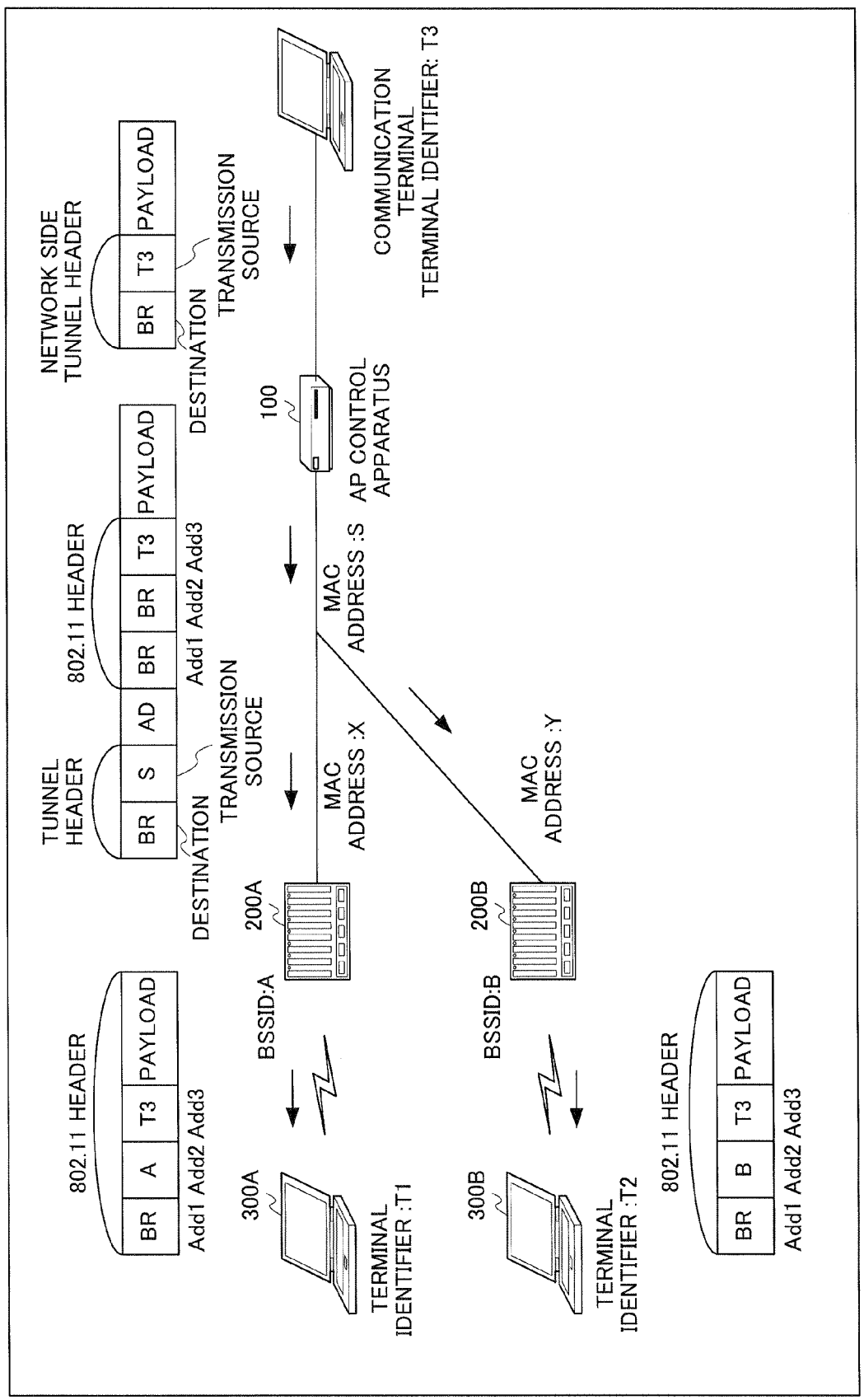
FIG. 10 shows frame transmission in the communication system in FIG. 1.

As shown in FIG. 10, an Ether frame is transmitted to AP control apparatus 100 through Ethernet (registered trademark) from a communication terminal which has terminal identifier T3. A broadcast address (BR) is stored in the destination MAC address in the header part (network side tunnel header part) of this Ether frame, and terminal identifier T3 of the communication terminal of the transmission source is stored in the transmission source MAC address.

Upon receiving the above-described Ether frame, AP control apparatus 100 performs conversion between the Ether header and the 802.11 header at frame conversion section 102 as described above. More specifically, the destination MAC address of the Ether header is stored in Add1, and the transmission source MAC address of the Ether header is stored in Add3. There is particularly no limitation to information stored in Add2, and it is only necessary to secure an area. The 802.11 frame encapsulated with the created 802.11 header is then generated.

In AP control apparatus 100, tunnel creation management section 103 adds a tunnel header to the 802.11 frame formed at frame conversion section 102. In this tunnel header, the destination MAC address is the broadcast address, and the transmission source MAC address is S which is the MAC address of AP control apparatus 100. AP control apparatus 100 then transmits the frame encapsulated with the tunnel header, and the frame whose destination MAC address of the tunnel header is a broadcast address to wireless LAN base station apparatus 200.

Since the destination MAC address is a broadcast address, upon receiving the frame from AP control apparatus 100, wireless LAN base station apparatus 200A removes the tunnel header, extracts the 802.11 frame, overwrites Add2 of the 802.11 header with BSSID: A assigned to wireless LAN base station apparatus 200A and transmits the result to communication terminal 300 under wireless LAN base station apparatus 200A.

Figure 11:
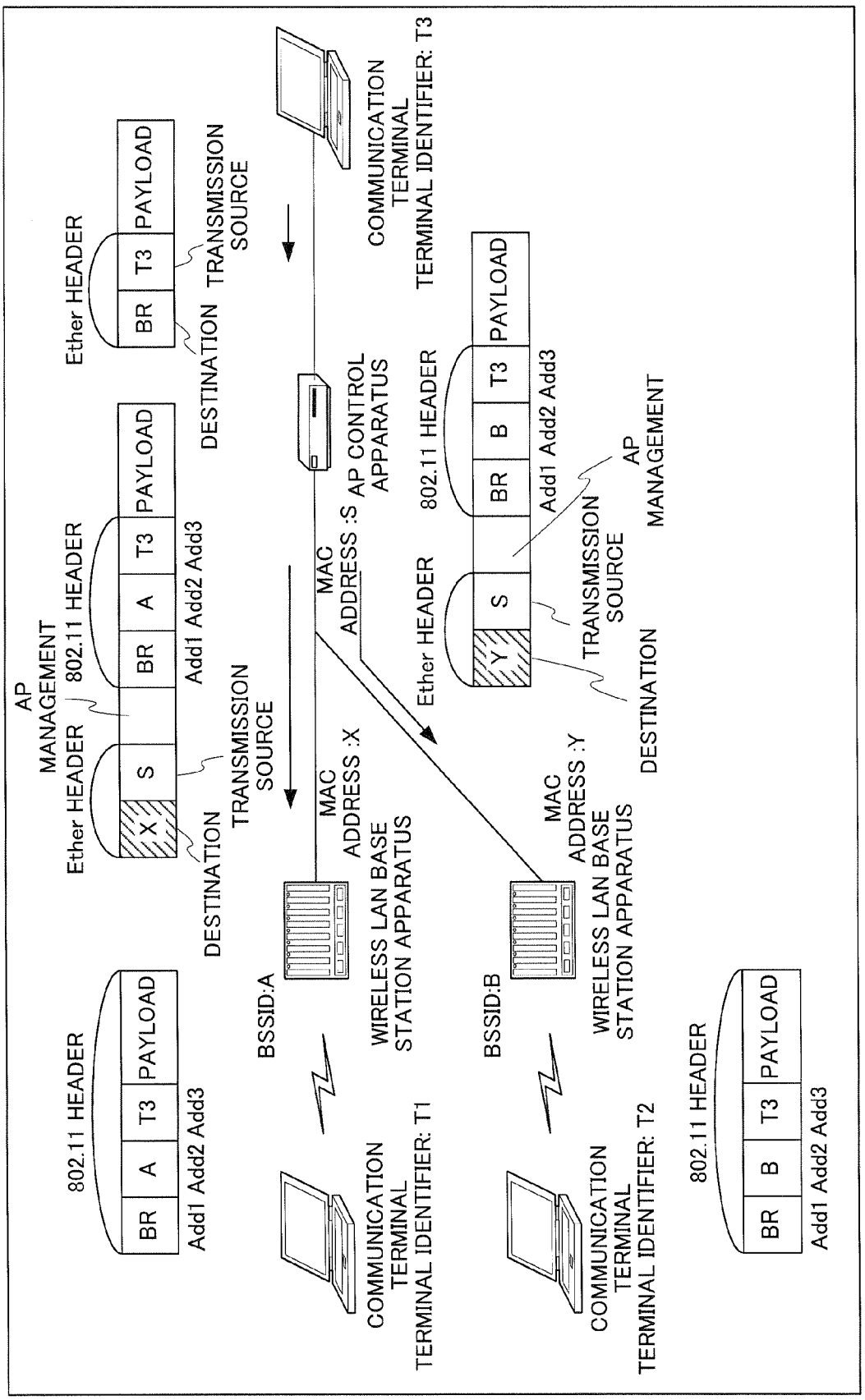
FIG. 11 shows frame transmission in a conventional communication system.

In the case of the conventional communication system, when the AP control apparatus receives a broadcast frame as shown in FIG. 11, the AP control apparatus makes the same number of copies of the frame as wireless LAN base station apparatuses under the AP control apparatus and transmits the frame taking the MAC address of each wireless LAN base station apparatus as the destination MAC address of the tunnel header. As for Add2 of the 802.11 header, the AP control apparatus stores the BSSID assigned to the destination wireless LAN base station apparatus.

As described above, in communication system 10 of this embodiment, upon receiving a broadcast frame, AP control apparatus 100 does not perform processing such as making the same number of copies as wireless LAN base station apparatuses under the AP control apparatus as in the conventional case, so that it is possible to reduce the amount of processing of the AP control apparatus. Therefore, it is possible to improve the performance of the AP control apparatus. Furthermore, the frame transmitted from the AP control apparatus upon receiving a broadcast frame is only the broadcast frame unlike the conventional case, and therefore the amount of traffic between the AP control apparatus and the wireless LAN base station apparatus can be reduced, so that it is possible to realize an efficient network design. On the other hand, the conventional wireless LAN base station apparatus only removes the header of the frame received from the AP control apparatus and transmits the 802.11 frame. Therefore, the amount of processing of wireless LAN base station apparatus 200 of this embodiment increases by the corresponding amount necessary for adding (more specifically storing it in Add2) a BSSID assigned to wireless LAN base station apparatus 200 to the wireless LAN header compared to the conventional wireless LAN base station. However, when the copying of the frame carried out by the conventional AP control apparatus is compared with the addition of a BSSID carried out by wireless LAN base station apparatus 200, the amount of processing of adding the BSSID is much less, and therefore the overall load on the system decreases considerably compared to the conventional system.

The above-described explanations have mainly described the case of broadcast, but in the case of multicast, the multicast may be used in place of the broadcast.

In this way, according to Embodiment 1, communication system 10 is provided with: AP control apparatus 100 including: frame conversion section 102 that forms a wireless LAN header (for example, 802.11 header) based on a header (network side tunnel header) of a data link layer of the received downlink broadcast frame or multicast frame and converts the broadcast frame or multicast frame to a wireless LAN frame (802.11 frame); tunnel creation management section 103 that forms a data link layer header (tunnel header) whose destination MAC address is a broadcast address or multicast address and encapsulates the wireless LAN frame with the data link layer header; and terminal side input/output section 105 that transmits the frame formed at tunnel creation management section 103; and wireless LAN base station apparatus 200 including: tunnel creation management section 202 that adds a BSSID assigned to wireless LAN base station apparatus 200 to the header part (802.11 header) of the wireless LAN frame whose tunnel header is removed from the received frame; and terminal side input/output section 204 that transmits the wireless LAN frame with the BSSID added to the header part thereof.

By so doing, upon receiving a broadcast frame, AP control apparatus 100 does not carry out processing such as making the same number of copies as wireless LAN base station apparatuses under AP control apparatus 100 as in the conventional case, and AP control apparatus 100 need only transmit one broadcast frame whose destination MAC address of the data link layer header (tunnel header) is a broadcast address, so that it is possible to reduce the amount of processing of the AP control apparatus. On the other hand, the conventional wireless LAN base station apparatus transmits a wireless LAN frame (for example, 802.11 frame) by only removing the header of the frame received from the AP control apparatus, and therefore the amount of processing of wireless LAN base station apparatus 200 of this embodiment increases compared with the conventional wireless LAN base station apparatus by the corresponding amount necessary for adding the BSSID assigned to wireless LAN base station apparatus 200 to the wireless LAN header (more specifically storing in Add2). However, when the copying of the frame carried out by the conventional AP control apparatus is compared with the addition of the BSSID carried out by wireless LAN base station apparatus 200, the amount of processing of adding the BSSID is much less, and therefore the overall load on the system decreases considerably compared to the conventional system. Therefore, when a broadcast frame or a multicast frame is communicated in downlink, it is possible to realize a communication system which can perform efficient communication.

Furthermore, according to Embodiment 1, AP control apparatus 100 is provided with: frame conversion section 102 that forms a wireless LAN header (for example, 802.11 header) based on the header (network side tunnel header) of the data link layer of the received downlink broadcast frame or multicast frame and converts the broadcast frame or multicast frame to a wireless LAN frame (802.11 frame); tunnel creation management section 103 that forms a data link layer header (tunnel header) whose destination MAC address is a broadcast address or multicast address and encapsulates the wireless LAN frame with the data link layer header; and terminal side input/output section 105 that transmits the frame formed at tunnel creation management section 103.

By so doing, when a broadcast frame is received, it is not necessary to carry out processing such as making the same number of copies as wireless LAN base station apparatuses under the AP control apparatus as in the conventional case, it is only necessary to transmit one broadcast frame whose destination MAC address of the data link layer header (tunnel header) is a broadcast address, so that it is possible to reduce the amount of processing and realize an AP control apparatus that can perform efficient communication when a broadcast frame or a multicast frame is communicated in downlink.

Furthermore, according to Embodiment 1, wireless LAN base station apparatus 200 is provided with: tunnel creation management section 202 that adds a BSSID assigned to wireless LAN base station apparatus to the header part (for example, the 802.11 header) of the wireless LAN frame obtained by removing the tunnel header from the frame transmitted from AP control apparatus 100 and to which a data link layer header (tunnel header) whose destination MAC address is a broadcast address or a multicast address is added; and terminal side input/output section 204 that transmits the wireless LAN frame with the BSSID added to the header part thereof.

By so doing, compared to the conventional wireless LAN base station apparatus which transmits a wireless LAN frame (for example, 802.11 frame) by only removing the header of the frame received from the AP control apparatus, the amount of processing of wireless LAN base station apparatus 200 is increased by the corresponding amount necessary for adding the BSSID assigned to wireless LAN base station apparatus 200 to the wireless LAN header (more specifically storing in Add2). However, wireless LAN base station apparatus 200 carries out processing of adding the BSSID, and AP control apparatus 100 thereby need not perform processing of making copies of the frame, which is performed by the conventional AP control apparatus, so that the overall load on the system reduces considerably compared to the conventional system. Therefore, it is possible to realize a wireless LAN base station apparatus which makes efficient communication possible when a broadcast frame or a multicast frame is communicated in downlink.

Embodiment 2

Figure 12:
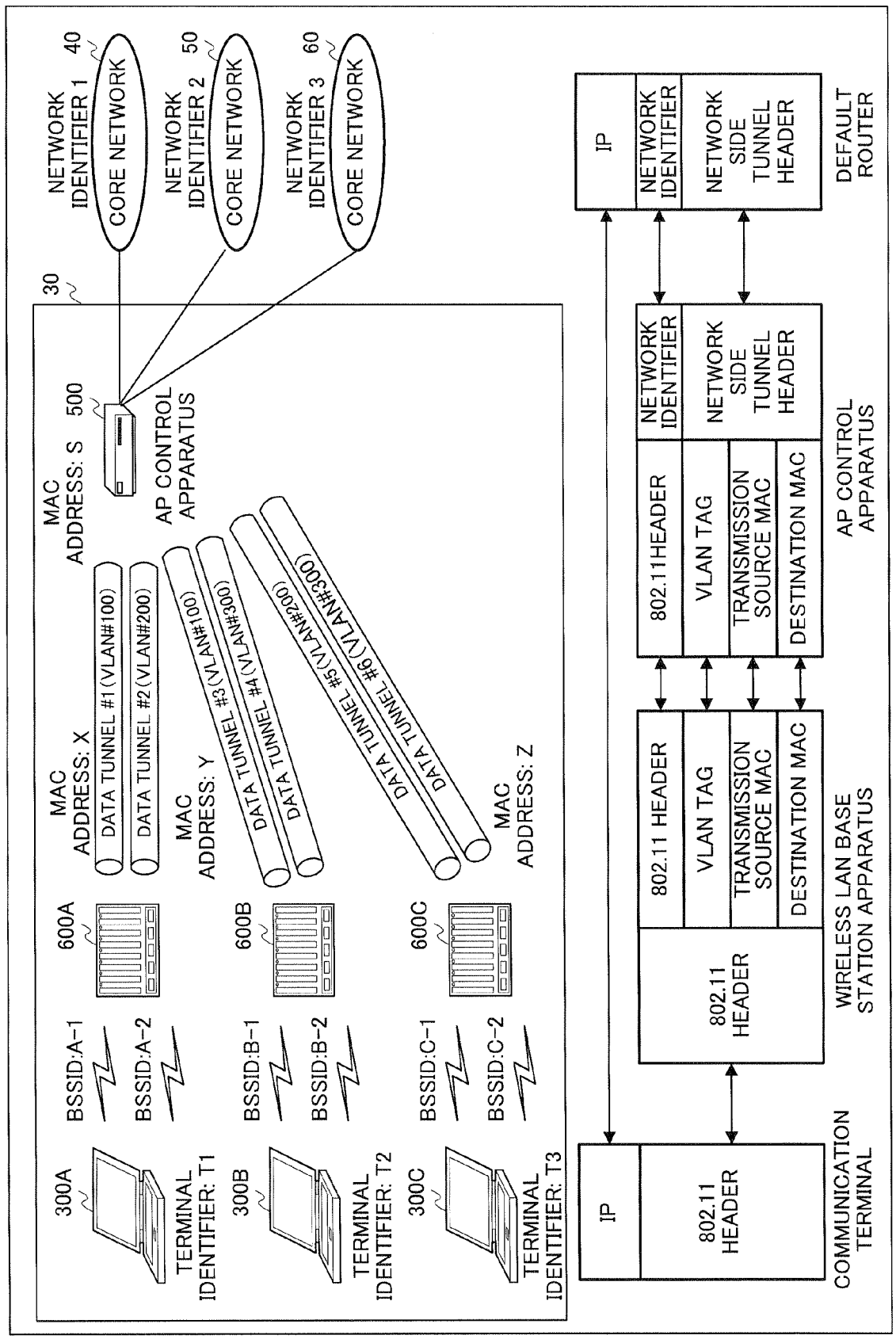
FIG. 12 illustrates an overall configuration of a communication system and protocol stacks according to Embodiment 2.

As shown in FIG. 12, communication system 30 according to Embodiment 2 is provided with: wireless LAN base station apparatus 600; AP control apparatus 500 as a wireless LAN base station control apparatus that forms a data tunnel between AP control apparatus 500 and wireless LAN base station apparatus 600, determined, that is, defined by a base station MAC address of wireless LAN base station apparatus 600 and a control station MAC address of AP control apparatus 500 and carries out communication using this data tunnel; and communication terminal 300 which accesses wireless LAN base station apparatus 600 to carry out communication. AP control apparatus 500 is connected to a plurality of network systems (here, core networks 40 to 60) located outside when seen from communication system 30.

In communication system 30, a plurality of data tunnels are formed between AP control apparatus 500 and wireless LAN base station apparatus 600. Moreover, in communication system 30, the formed data tunnels are grouped, and each grouped data tunnel forms a virtual LAN. More specifically, for example, the same tunnel group identifier #100 is assigned to data tunnel #1 and data tunnel #3, and these data tunnels constitute virtual LANs. By so doing, when a broadcast frame is transmitted especially in downlink, AP control apparatus 500 need not create any unicast frame for each data tunnel which becomes a transmission destination and need only transmit broadcast frames in tunnel group units, so that it is possible to reduce the amount of processing at AP control apparatus 500.

Furthermore, by associating network identifiers of network systems outside AP control apparatus 500 with tunnel group identifiers, AP control apparatus 500 can determine, according to the network system through which a broadcast frame is transmitted, to which virtual LAN the broadcast frame should be transmitted, so that it is possible to reduce the amount of processing.

Furthermore, as shown in FIG. 12, when a downlink frame is transmitted through default routers which exist in core networks 40 to 60, AP control apparatus 500 receives the frame to which a tunnel header (hereinafter referred to as "network side tunnel header" and distinguished from the tunnel header used between AP control apparatus 500 and wireless LAN base station apparatus 600) and a network identifier indicating from which core network the frame comes are added. When core networks 40 to 60 are Ethernet (registered trademark), the network side tunnel header is an Ether header.

Using the network side tunnel header, AP control apparatus 500 creates a tunnel header to be used between AP control apparatus 500 and wireless LAN base station apparatus 600 and an 802.11 header to be used when a frame is transmitted from wireless LAN base station apparatus 600 to communication terminal 300, encapsulates an 802.11 frame with the created tunnel header and the 802.11 header and transmits the result to wireless LAN base station apparatus 600. The tunnel header of Embodiment 2 is provided with a VLAN tag area which stores a virtual LAN identifier (tunnel group identifier) in addition to the destination MAC address and the transmission source MAC address. Furthermore, in Embodiment 2, network identifiers are also associated with virtual LAN identifiers. That is, the virtual LAN of the destination is determined according to the core network of the transmission source of the frame. However, when ports connected to the respective core networks are physically separated in AP control apparatus 500, network identifiers need not be added to frames transmitted from the core network sides, and, in this case, identifiers of ports at which the frames are received may be handled as network identifiers.

Upon receiving the frame from AP control apparatus 500, wireless LAN base station apparatus 600 removes the tunnel header, that is, decapsulates the frame and transmits the frame to communication terminal 300.

When the above-described downlink frame is especially a broadcast frame, AP control apparatus 500 uses a broadcast address as the destination MAC address of the created tunnel header. Upon receiving the frame from AP control apparatus 500, wireless LAN base station apparatus 600 removes the tunnel header and transmits the frame to communication terminal 300 as the 802.11 frame. At this time, wireless LAN base station apparatus 600 overwrites Add2 of the 802.11 frame with a BSSID corresponding to the tunnel group identifier stored in the VLAN tag area of the tunnel header. By so doing, it is possible to deliver a frame to a terminal which exists in the broadcast domain under AP control apparatus 500. At that time, AP control apparatus 500 need not copy the frame.

Figure 13:
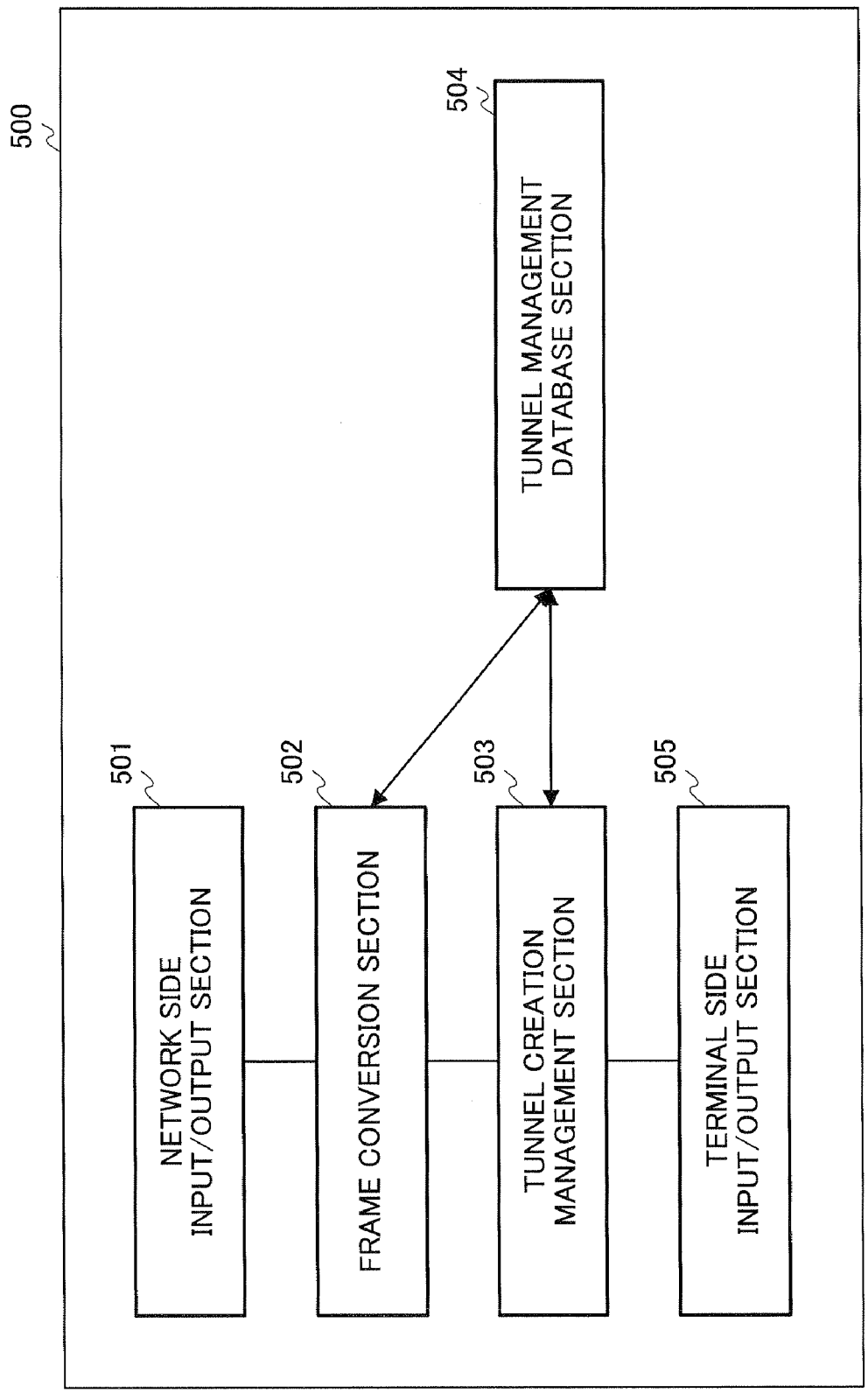
FIG. 13 is a block diagram showing the configuration of the AP control apparatus in FIG. 12.

As shown in FIG. 13, AP control apparatus 500 of Embodiment 2 is provided with network side input/output section 501, frame conversion section 502, tunnel creation management section 503 as a frame formation section that forms a transmission header whose destination address is a broadcast address or a multicast address and encapsulates a wireless LAN frame with the transmission header, tunnel management database section 504 and terminal side input/output section 505.

Network side input/output section 501 inputs/outputs a frame to/from the network side, that is, the core network 40 to 60 side. More specifically, network side input/output section 501 transmits the frame inputted from core network 40 to 60 side to frame conversion section 502 and also transmits the frame inputted from frame conversion section 502 to core networks 40 to 60 to which the frame should be transmitted.

Frame conversion section 502 creates an 802.11 header to be used upon transmitted from wireless LAN base station apparatus 600 to communication terminal 300 using the network side tunnel header and encapsulates the 802.11 frame with the 802.11 header. That is, frame conversion section 502 converts the frame. Furthermore, frame conversion section 502 gives the network identifier which is added to the frame received from the network side to tunnel creation management section 503 using a predetermined method.

Tunnel creation management section 503 creates a data tunnel and manages tunnel management database section 504. Furthermore, tunnel creation management section 503 divides the inputted frame among data tunnels. In that case, tunnel creation management section 503 creates a tunnel header to add to the frame.

As shown in FIG. 14, tunnel management database section 504 is provided with a data frame tunnel table, a data frame correspondence table and a group correspondence table.

As shown in FIG. 14A, the data frame tunnel table stores entries of data tunnels to communicate data frames, and each data tunnel is defined (specified) by a set of a destination MAC address, a transmission source MAC address and a VLAN tag ID.

Furthermore, in the data frame tunnel table, a tunnel identifier comprised of a set of a destination MAC address, a transmission source MAC address and a VLAN tag ID is associated with a tunnel group identifier. For example, tunnel ID1 and tunnel ID3 of the data frame tunnel table in FIG. 14A have the same tunnel group identifier #100, and the data tunnels specified by tunnel ID1 and tunnel ID3 form the same virtual LANs.

As shown in FIG. 14B, the data frame correspondence table defines (specifies) which data tunnel is used for each data frame. For example, when the terminal identifier of communication terminal 300A is T1, if a data frame is exchanged between communication terminal 300A and AP control apparatus 500, the data frame correspondence table defines (specifies) that a data tunnel of tunnel ID1 in the data frame tunnel table is used.

As shown in FIG. 14C, the group correspondence table stores network identifiers and tunnel group identifiers associated with each other. This group correspondence table is used especially when the broadcast frame is transmitted in downlink, and the network identifier of the network system through which the broadcast frame is transmitted is associated with a tunnel group identifier which specifies a virtual LAN through which the broadcast frame should be transmitted.

Terminal side input/output section 505 transmits the frame received from tunnel creation management section 503 to wireless LAN base station apparatus 600 and also transmits a frame from wireless LAN base station apparatus 600 to tunnel creation management section 503.

Figure 15:
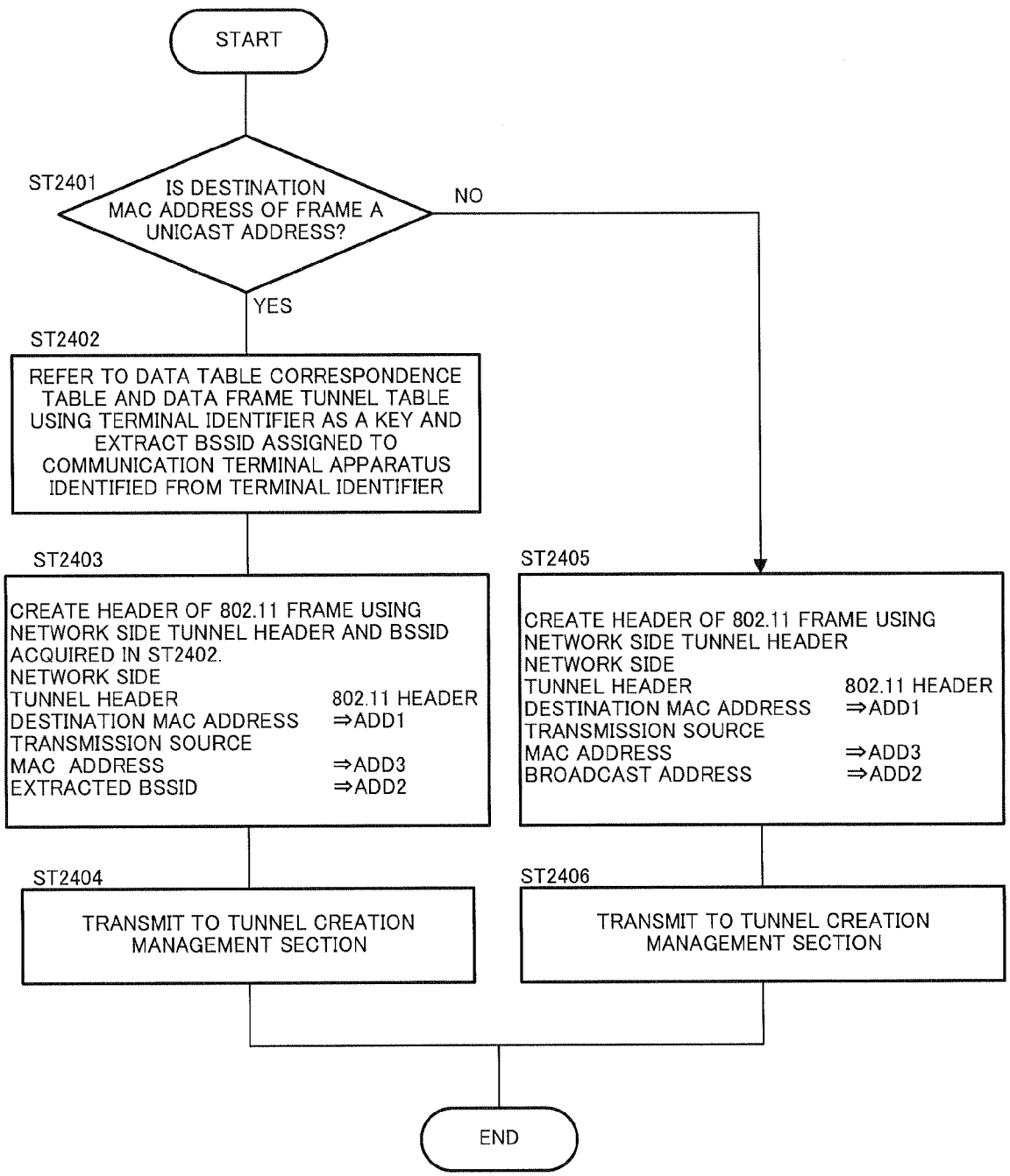
FIG. 15 is a flowchart illustrating the operation of the frame conversion section in FIG. 13.

Next, the operation of frame conversion section 502 will be explained with reference to FIG. 15. FIG. 15 only shows the flow of a downlink frame in particular, that is, a case where frame conversion section 502 receives a frame from network side input/output section 501 as input.

Upon receiving the frame from network side input/output section 501, frame conversion section 502 judges first whether or not the destination MAC address of the frame is a unicast address (step ST2401).

When the decision result shows that the destination MAC address is a unicast address (step ST2401: YES), this unicast address is a terminal identifier of communication terminal 300 which is the destination of the frame, and therefore frame conversion section 502 refers to the data frame correspondence table and the data frame tunnel table of tunnel management database section 504 using this terminal identifier as a key and extracts a BSSID assigned to communication terminal 300 identified from the terminal identifier (step ST2402). More specifically, frame conversion section 502 refers to the data frame correspondence table using the terminal identifier which is a unicast address as a key and extracts the tunnel ID which corresponds to the terminal identifier. Frame conversion section 502 then refers to the data frame tunnel table and acquires a BSSID which corresponds to the extracted tunnel ID.

In step ST2403, frame conversion section 502 creates the header of the 802.11 frame using the network side tunnel header added to the frame transmitted from the network side and the BSSID acquired in step ST2402. More specifically, the destination MAC address of the network side tunnel header is inputted to Add1 of the 802.11 frame, the transmission source MAC address of the network side tunnel header is inputted to Add3 of the 802.11 frame, and the BSSID acquired in step ST2402 is inputted to Add2. The configuration of the data frame between AP control apparatus 500 and wireless LAN base station apparatus 600 will be described later with reference to FIG. 20.

In step ST2404, frame conversion section 502 transmits the 802.11 frame with the header created in step ST2403 added to tunnel creation management section 503.

Furthermore, when the decision result in step ST2401 shows that the destination MAC address is not a unicast address, that is, when the destination MAC address is a multicast address or a broadcast address (step ST2401: NO), frame conversion section 502 creates the header of the 802.11 frame using the network side tunnel header added to the frame transmitted from the network side (step ST2405). More specifically, the destination MAC address of the network side tunnel header is inputted to Add1 of the 802.11 frame, the transmission source MAC address of the network side tunnel header is inputted to Add3 of the 802.11 frame, and the network identifier added to the frame is inputted to Add2.

The network identifier is inputted to Add2 in order to hand over the network identifier to tunnel creation management section 503, and the method thereof is not particularly limited. As other methods, for example, instead of storing the network identifier in Add2, it is also possible to add the network identifier to the frame as the header within the apparatus and thereby transfer the network identifier, or share a storage area in which information is temporarily stored by frame conversion section 502 and tunnel creation management section 503 and thereby transfer the network identifier. In the case of the other methods, information to be stored in the Add2 area is not limited, and it is only necessary to secure the area. However, the method of storing the network identifier in Add2 requires no additional protocol or component to be provided, and is therefore a method that can be implemented most easily.

In step ST2406, frame conversion section 502 transmits the 802.11 frame to which the header created in step ST2405 is added to tunnel creation management section 503.

Figure 16:
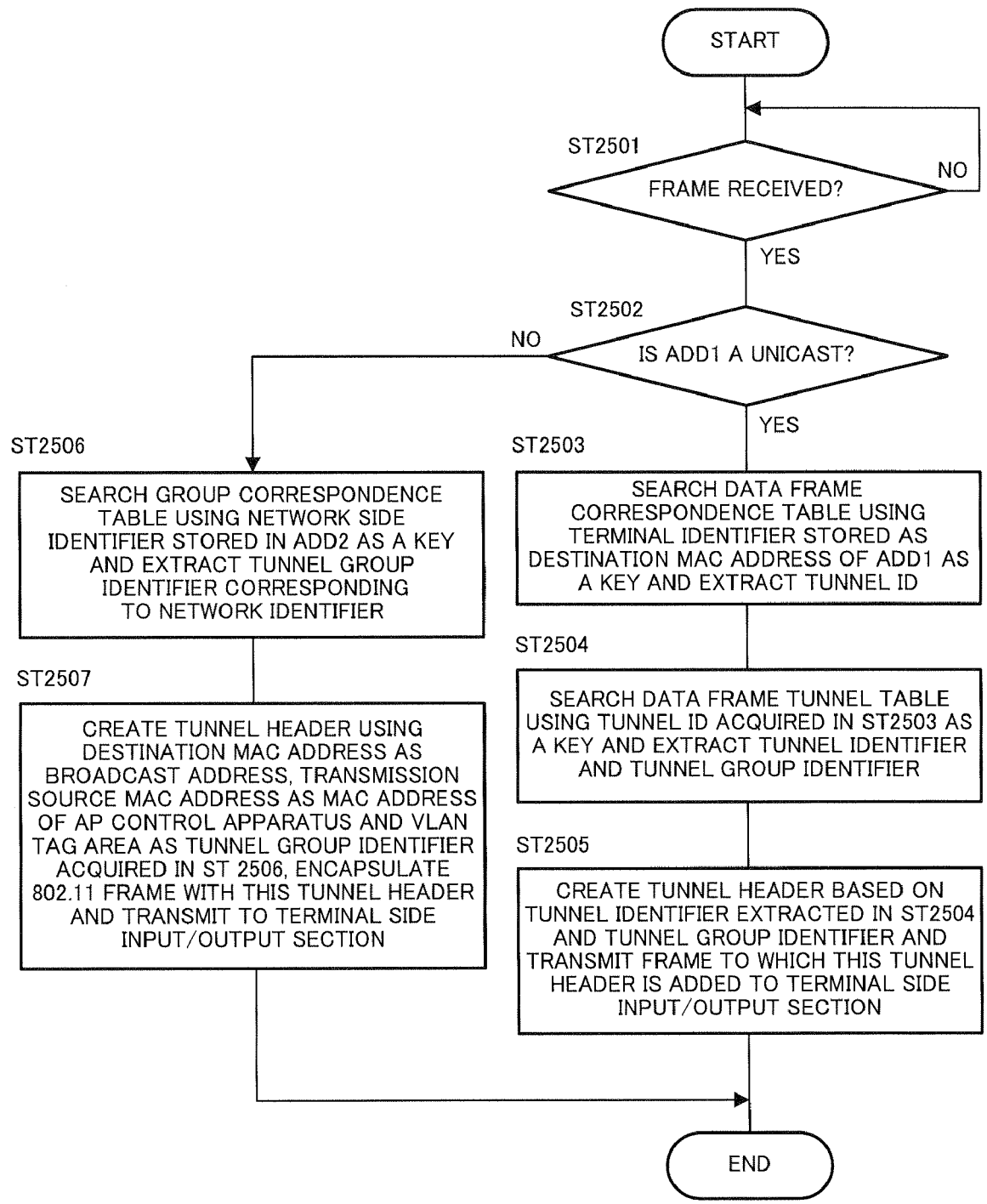
FIG. 16 is a flowchart illustrating the operation of the tunnel creation management section in FIG. 13.

Next, the operation of tunnel creation management section 503 will be explained with reference to FIG. 16. FIG. 16 only shows the flow of the downlink frame in particular, that is, the case where tunnel creation management section 503 receives a frame from frame conversion section 502 as input.

When receiving a frame in step ST2501, tunnel creation management section 503 judges first whether or not Add1 of the frame is a unicast address (step ST2502).

When the decision result in step ST2502 shows that Add1 is a unicast address (step ST2502: YES), tunnel creation management section 503 searches the data frame correspondence table using the terminal identifier stored as the destination MAC address of Add1 as a key and extracts the corresponding tunnel ID (step ST2503).

In step ST2504, tunnel creation management section 503 searches the data frame tunnel table using the tunnel ID acquired in step ST2503 as a key and extracts the corresponding tunnel identifier and tunnel group identifier.

In step ST2505, tunnel creation management section 503 creates a tunnel header based on the tunnel identifier and the tunnel group identifier extracted in step ST2504 and transmits the frame to which this tunnel header is added to terminal side input/output section 505.

When the decision result in step ST2502 shows that Add1 is not a unicast address, that is, in the case where Add1 is a multicast address or a broadcast address (step ST2502: NO), tunnel creation management section 503 searches the group correspondence table using the network identifier stored in the Add2 area as a key and extracts the tunnel group identifier which corresponds to the network identifier (step ST2506).

In step ST2507, tunnel creation management section 503 creates a tunnel header taking the destination MAC address as a broadcast address, the transmission source MAC address as the MAC address of AP control apparatus 500 and the VLAN tag area as the tunnel group identifier acquired in step ST2506, and encapsulates the 802.11 frame received from frame conversion section 502 with this tunnel header to transmit to terminal side input/output section 505 (step ST2507).

The above explanation given with reference to FIG. 16 has described the case where the core network has a one-to-one correspondence with the virtual LAN (that is, tunnel group identifier), but this is by no means limiting, and one core network may also be associated with a plurality of tunnel group identifiers. In this case, tunnel creation management section 503 makes the same number of copies of the frame as the tunnel group identifiers associated with the core network, repeats the processing in step ST2506 and step ST2507 the number of times corresponding to the number.

Figure 17:
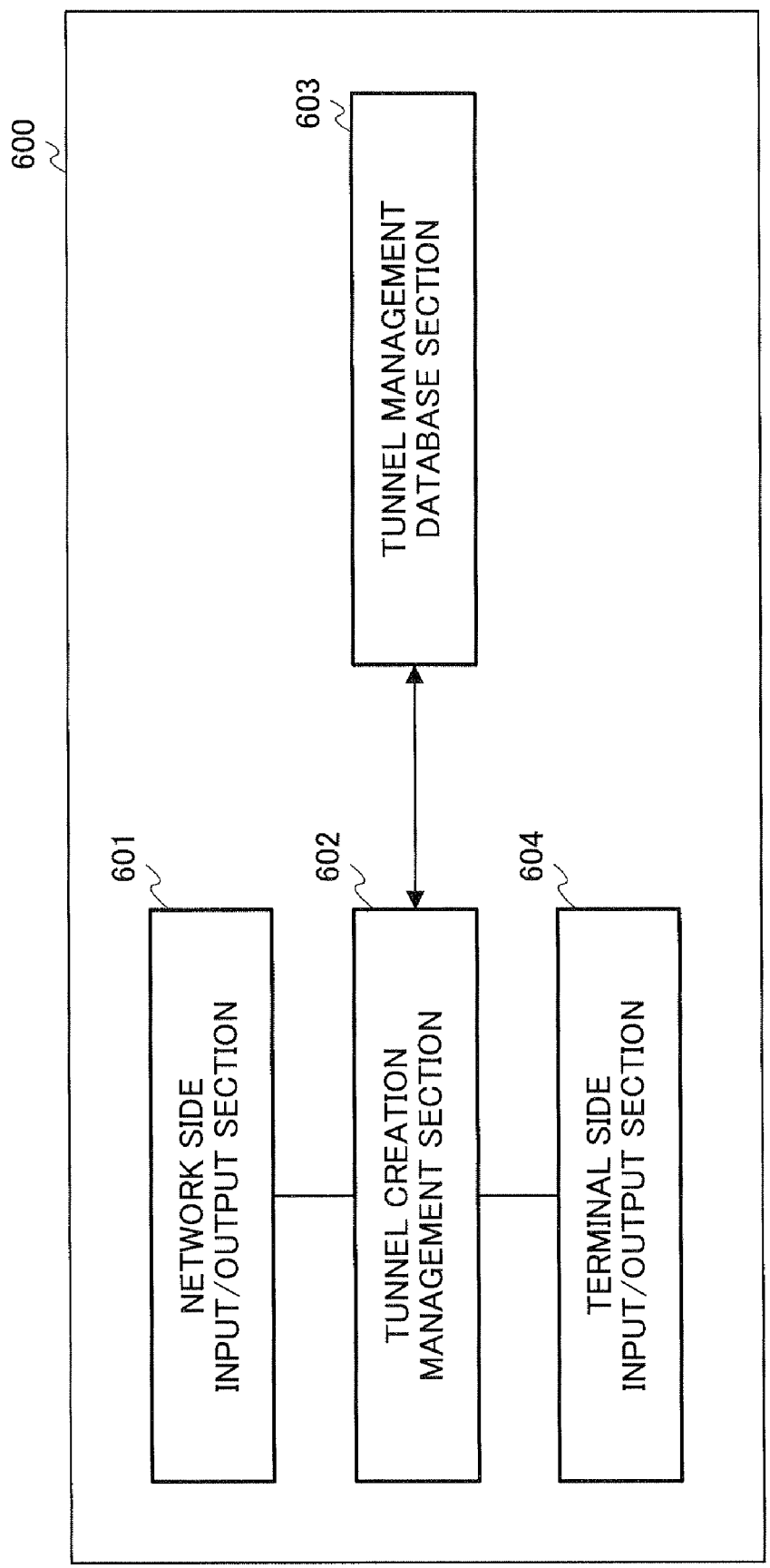
FIG. 17 is a block diagram showing the configuration of the wireless LAN base station apparatus in FIG. 12.

As shown in FIG. 17, wireless LAN base station apparatus 600 has network side input/output section 601, tunnel creation management section 602, tunnel management database section 603 and terminal side input/output section 604.

Network side input/output section 601 inputs/outputs a frame to/from the network side, that is, the AP control apparatus 500 side. More specifically, network side input/output section 601 transmits the frame inputted from the AP control apparatus 500 side to tunnel creation management section 602 and transmits the frame inputted from tunnel creation management section 602 to AP control apparatus 500.

Tunnel creation management section 602 creates a data tunnel and manages tunnel management database section 603. Furthermore, tunnel creation management section 602 divides the inputted frame among data tunnels. Details of the operation of this tunnel creation management section 602 will be described later.

As shown in FIG. 18, tunnel management database section 603 is provided with a data frame tunnel table.

As shown in FIG. 18, the data frame tunnel table stores entries of data tunnels to communicate data frames, and each data tunnel is defined (specified) by a set of a destination MAC address, a transmission source MAC address and a VLAN tag ID. Furthermore, each data tunnel is associated with a tunnel group identifier and a BSSID.

Terminal side input/output section 604 transmits the frame from communication terminal 300 to tunnel creation management section 602 and also transmits the frame from tunnel creation management section 602 to communication terminal 300.

Figure 19:
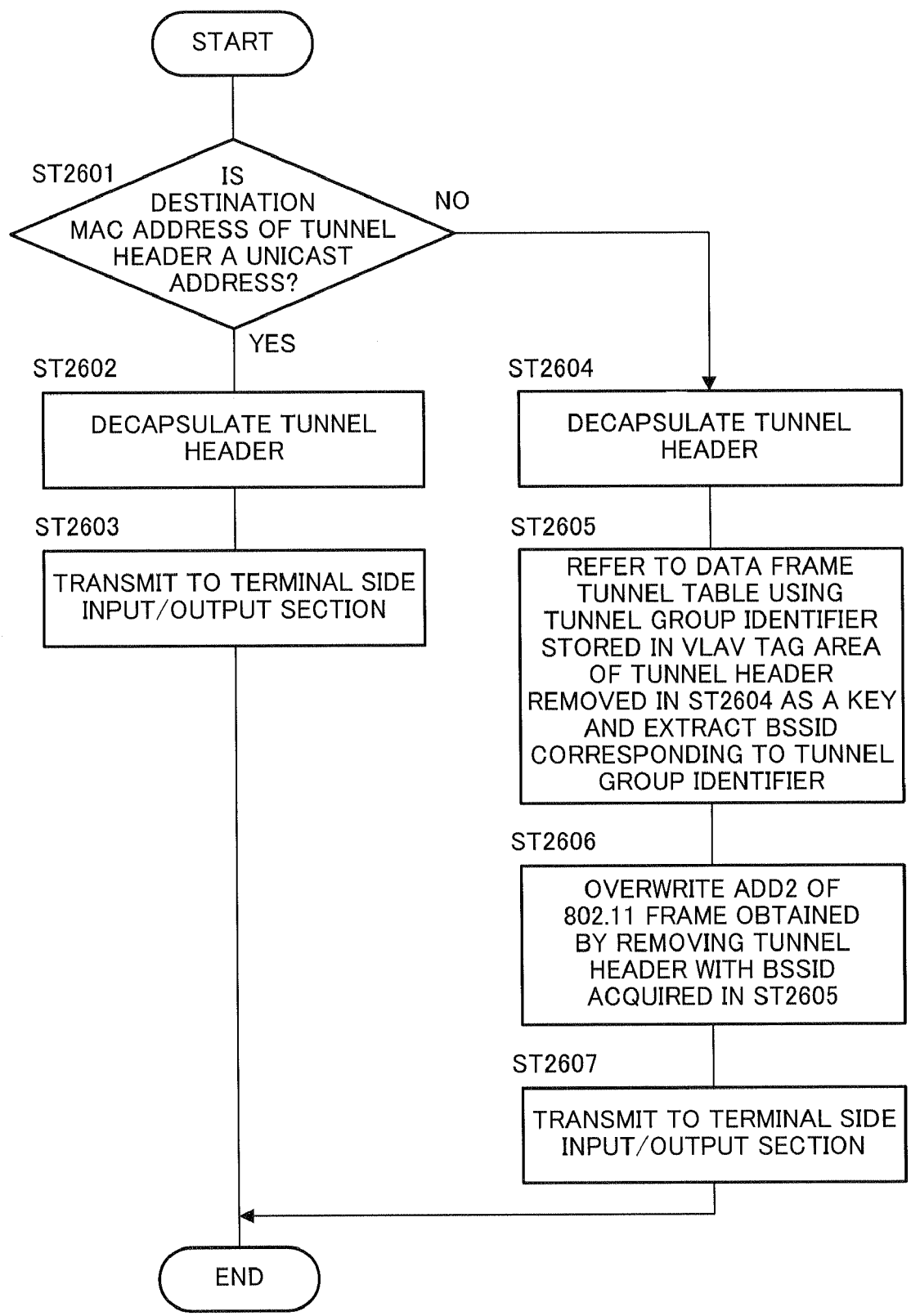
FIG. 19 is a flowchart illustrating the operation of the tunnel creation management section in FIG. 17.

Next, the operation of tunnel creation management section 602 will be explained with reference to FIG. 19. FIG. 19 only shows the flow of a downlink frame in particular, that is, the case where tunnel creation management section 602 receives a frame from network side input/output section 601 as input.

Tunnel creation management section 602 judges whether or not the destination MAC address of the tunnel header of the received frame is a unicast address (step ST2601).

When the decision result shows that the destination MAC address is a unicast address (step ST2601: YES), tunnel creation management section 602 removes the tunnel header, that is, performs decapsulation (step ST2602).

In step ST2603, tunnel creation management section 602 transmits the 802.11 frame obtained by removing the tunnel header to terminal side input/output section 604 (step ST2603).

When the decision result in step ST2601 shows that the destination MAC address is not a unicast address, that is, the destination MAC address is a broadcast address or a multicast address (step ST2601: NO), tunnel creation management section 602 removes the tunnel header (step ST2604).

In step ST2605, tunnel creation management section 602 refers to the data frame tunnel table using the tunnel group identifier which is stored in the VLAN tag area of the tunnel header which has been removed in step ST2604 as a key and extracts a BSSID which corresponds to the tunnel group identifier.

In step ST2606, tunnel creation management section 602 overwrites Add2 of the 802.11 frame obtained by removing the tunnel header with the BSSID acquired in step ST2605.

In step ST2607, tunnel creation management section 602 transmits the 802.11 frame obtained by modifying the header part obtained in step ST2606 to terminal side input/output section 604.

The above explanation given with reference to FIG. 19 has described the case where a virtual LAN (that is, the tunnel group identifier) has a one-to-one correspondence with a BSSID, but this is by no means limiting, and the virtual LAN may also be associated with a plurality of BSSIDs. In this case, tunnel creation management section 602 makes the same number of copies of the frame as the BSSIDs associated with the virtual LAN and repeats the processing in step ST2606 the number of times corresponding to the number.

Next, the configuration of the data frame used between the AP control apparatus 500 and wireless LAN base station apparatus 600 will be explained with reference to FIG. 20.

Figure 20:
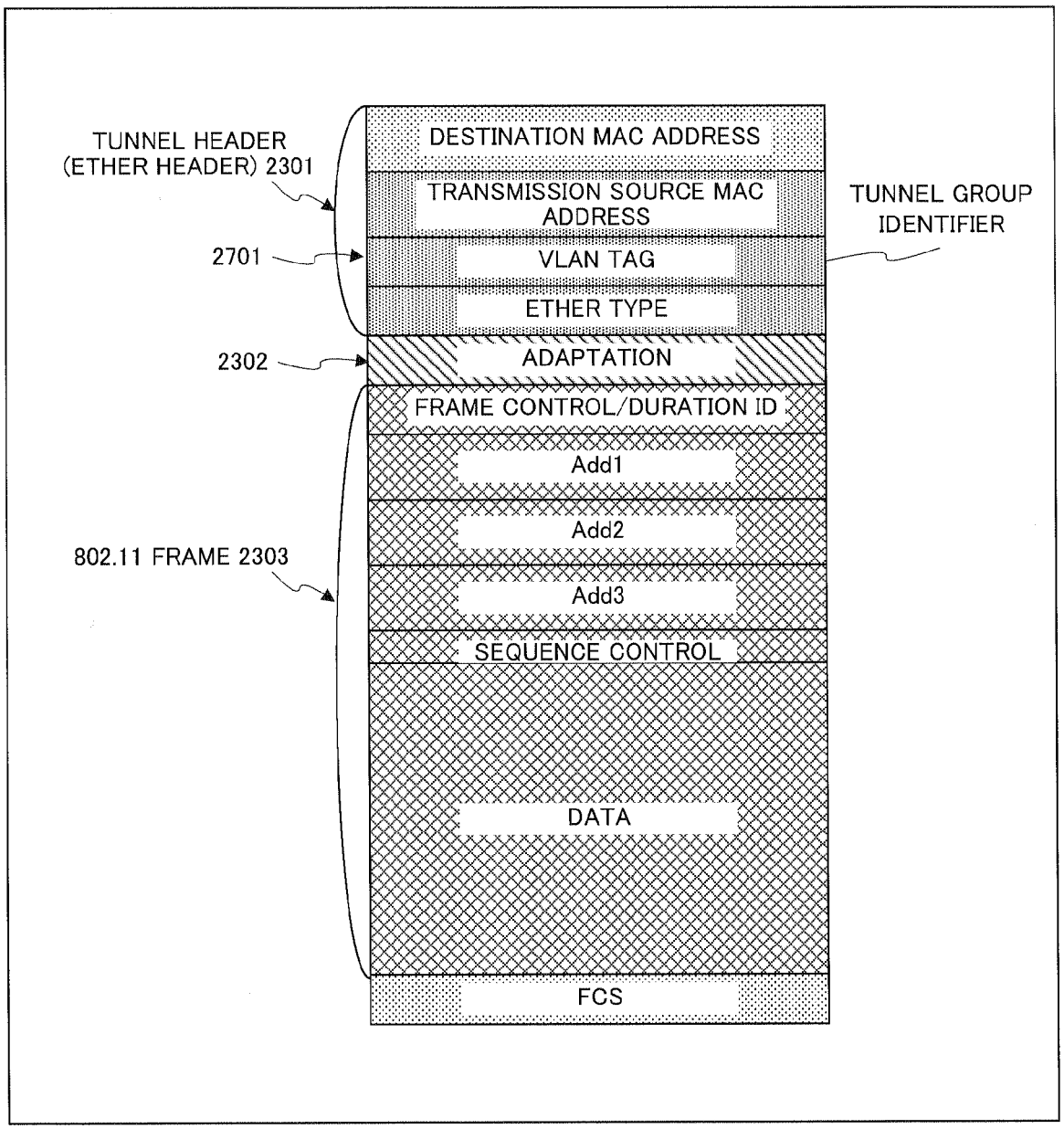
FIG. 20 illustrates the configuration of a data frame.

As in the case of the configuration of the data frame used between AP control apparatus 100 and wireless LAN base station apparatus 200 shown in FIG. 9, the data frame as shown in FIG. 20 is provided with tunnel header 2301 (here, Ether header), adaptation 2302 and 802.11 frame 2303. Here, tunnel header 2301 is comprised of VLAN tag area 2701 in addition to a destination MAC address, a transmission source MAC address and an Ether type.

Frame transmission carried out in communication system 30 in the above-described configuration will be explained with reference to FIG. 21. Here, downlink broadcast frame transmission is especially shown.

Figure 21:
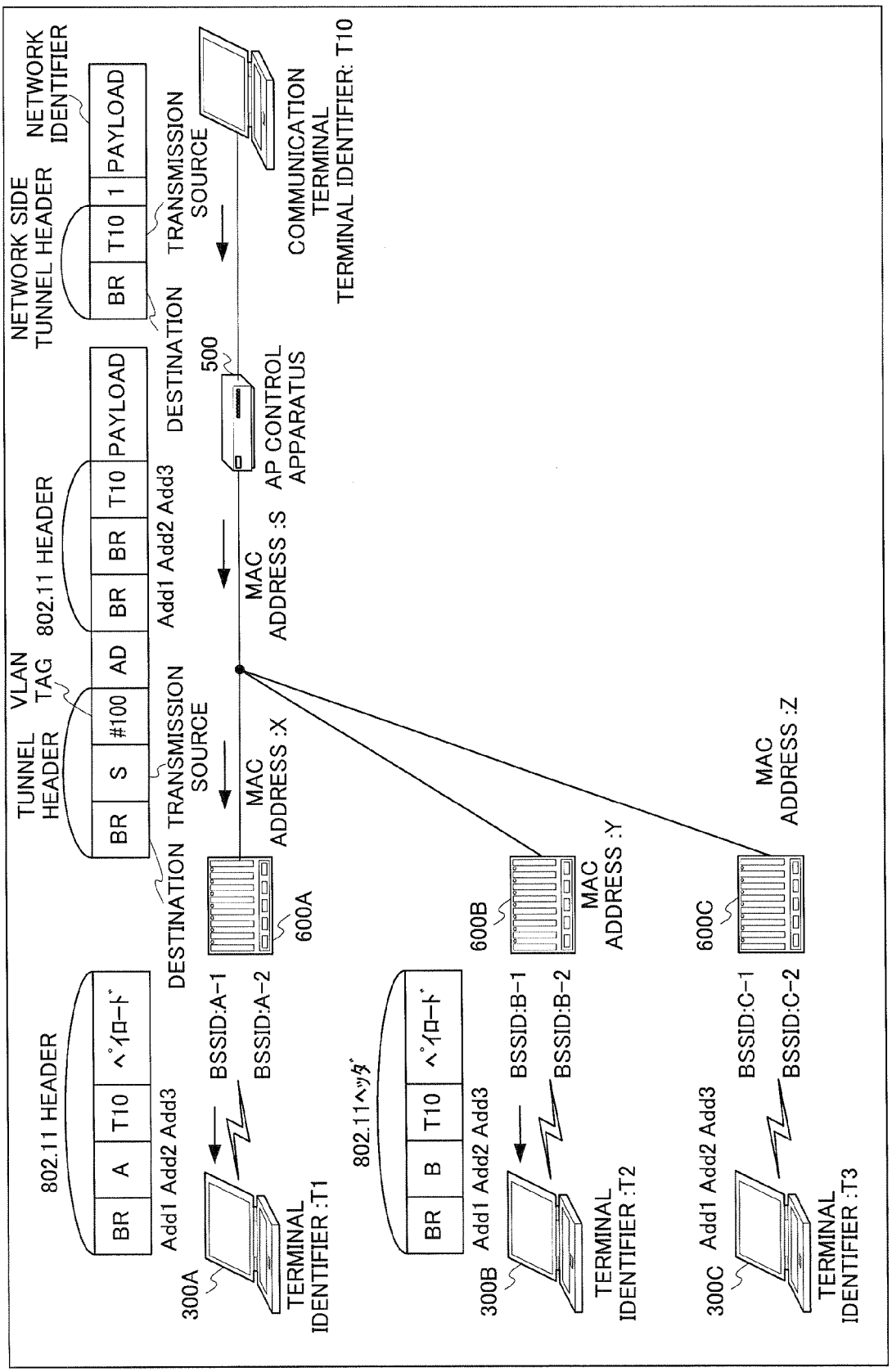
FIG. 21 shows frame transmission in the communication system in FIG. 12.

As shown in FIG. 21, an Ether frame is transmitted to AP control apparatus 500 from the communication terminal which has terminal identifier T10 through Ethernet (registered trademark). The header part (network side tunnel header part) of this Ether frame stores a broadcast address (BR) at the destination MAC address and stores terminal identifier T10 of the communication terminal of the transmission source at the transmission source MAC address. Furthermore, this communication terminal belongs to core network 40, and network identifier 1 is added to the Ether frame which is transmitted to AP control apparatus 500.

Upon receiving the above Ether frame, in AP control apparatus 500, frame conversion section 502 performs conversion between an Ether header and an 802.11 header as described above. The destination MAC address of the network side tunnel header is inputted to Add1 of the 802.11 frame, the transmission source MAC address of the network side tunnel header is inputted to Add3 of the 802.11 frame, and the network identifier which is added to the frame is inputted to Add2.

In AP control apparatus 500, tunnel creation management section 503 then adds the tunnel header to the 802.11 frame formed at frame conversion section 502. This tunnel header takes the destination MAC address as a broadcast address, the transmission source MAC address as S which is the MAC address of AP control apparatus 500 and further the VLAN tag area as #100 corresponding to network identifier 1. AP control apparatus 500 then transmits the frame encapsulated with the tunnel header, the frame whose destination MAC address of the tunnel header being a broadcast address, to wireless LAN base station apparatus 600.

Upon receiving a frame from AP control apparatus 500, wireless LAN base station apparatuses 600A and 600B recognize that the frame is a frame directed to wireless LAN base station apparatuses 600A and 600B since the destination MAC address is a broadcast address and a data tunnel corresponding to tunnel group identifier #100 included in the VLAN tag ID area is set, and remove the tunnel header, extract the 802.11 frame, overwrite Add2 of the 802.11 header with BSSID: A-1 and BSSID: B-1 corresponding to tunnel group identifier #100 and transmit the respective frames to communication terminal 300A and communication terminal 300B under wireless LAN base station apparatuses 600A and 600B. Since the data tunnel corresponding to tunnel group identifier #100 is not set for wireless LAN base station apparatus 600C, wireless LAN base station apparatus 600C is not particularly operated.

As shown above, in communication system 30 of this embodiment, upon receiving a broadcast frame, AP control apparatus 500 does not perform processing such as making the same number of copies of the frame as wireless LAN base station apparatuses under AP control apparatus 500 as in the conventional case, so that the amount of processing of the AP control apparatus can be reduced. Therefore, it is possible to improve the performance of the AP control apparatus. Furthermore, upon receiving the broadcast frame, the frame transmitted from the AP control apparatus is only a broadcast frame unlike the conventional case, so that it is possible to reduce the amount of traffic between the AP control apparatus and the wireless LAN base station apparatus and thereby realize an efficient network design.

Furthermore, in communication system 30, network identifiers, tunnel group identifiers and BSSIDs are associated with each other, that is, core networks, virtual LANs and BSSIDs are associated with each other, so that it is possible to deliver a frame only to communication terminal 300 to which a BSSID according to the core network through which the frame is transmitted is assigned.

Furthermore, network identifiers, tunnel group identifiers and BSSIDs are associated with each other in communication system 30, and therefore, upon receiving a broadcast frame, AP control apparatus 500 includes a tunnel group identifier which corresponds to the network identifier of the network through which the broadcast frame is transmitted in the tunnel header, and thereby need not carry out heavy processing such as making copies of the frame carried out by the conventional AP control apparatus and need only transmit the frame using the destination MAC address of the tunnel header as a broadcast address. On the other hand, the conventional wireless LAN base station apparatus transmits the 802.11 frame by only removing the header of the frame received from the AP control apparatus, and therefore the amount of processing of the wireless LAN base station apparatus 600 of this embodiment increases by the corresponding amount necessary for adding (more specifically, store in Add2) a BSSID corresponding to the tunnel group identifier added to the frame to the wireless LAN header compared to the conventional wireless LAN base station apparatus. However, when making copies of the frame carried out by the conventional AP control apparatus is compared with the addition of a BSSID carried out by wireless LAN base station apparatus 600, the amount of processing of the addition of a BSSID is much less, and therefore the overall load on the system decreases considerably compared to the conventional system.

In the above explanation, as seen from the data frame tunnel table (FIG. 14A, FIG. 18), the data tunnel which is formed between AP control apparatus 500 and wireless LAN base station apparatus 600 is defined by the set of a destination MAC address, a transmission source MAC address and a VLAN tag ID. However, the present invention is not limited to this, and the data tunnel can be defined by the set of the destination MAC address and the transmission source MAC address using the BSSID assigned to wireless LAN base station apparatus 600 as the MAC address of wireless LAN base station apparatus 600 on the AP control apparatus 500 side. Point is that it is only necessary that a BSSID, a tunnel identifier which defines a data tunnel and a tunnel group identifier which identifies a virtual LAN be associated with each other.

The above-described explanation has mainly described the case of broadcast, but in the case of multicast, the multicast may be in place of the broadcast.

According to Embodiment 2 in this way, communication system 30 is provided with: AP control apparatus 500 including: frame conversion section 502 that forms a wireless LAN header (for example, 802.11 header) based on the header (network side tunnel header) of a data link layer of the received downlink broadcast frame or multicast frame and converts the broadcast frame or multicast frame to a wireless LAN frame (802.11 frame); tunnel creation management section 503 that forms a data link layer header (tunnel header) whose destination MAC address is a broadcast address or multicast address and encapsulates the wireless LAN frame with the data link layer header; and terminal side input/output section 505 that transmits the frame formed at tunnel creation management section 503; and wireless LAN base station apparatus 600 including: tunnel creation management section 602 that adds a BSSID assigned to wireless LAN base station apparatus 600 to the header part (802.11 header) of the wireless LAN frame obtained by removing the tunnel header from the received frame; and terminal side input/output section 604 that transmits the wireless LAN frame with the BSSID added to the header part thereof.

Tunnel creation management section 503 then adds identification information (tunnel group identifier) of a virtual LAN formed between AP control apparatus 500 and wireless LAN base station apparatus 600 according to the network identification information (network identifier) of the network through which the broadcast frame has been transmitted, to the data link layer header (tunnel header).

By so doing, when the broadcast frame is transmitted in downlink, AP control apparatus 500 need not create a unicast frame for each destination, and need only transmit the broadcast frame in virtual LAN units, so that it is possible to reduce the amount of processing at AP control apparatus 500. Moreover, by associating the network identifier of the network system with the tunnel group identifier, it is determined to which virtual LAN the frame is transmitted according to the network system through which the broadcast frame is transmitted, so that AP control apparatus 500 can reduce the amount of processing.

Furthermore, tunnel creation management section 602 adds a BSSID corresponding to the virtual LAN identification information added to the received frame.

By so doing, the frame can be transmitted only to a communication terminal to which the BSSID corresponding to the virtual LAN through which the frame is transmitted is assigned.

According to Embodiment 2, AP control apparatus 500 is provided with: frame conversion section 502 that forms a wireless LAN header (for example, 802.11 header) based on the header (network side tunnel header) of the data link layer of the received downlink broadcast frame or multicast frame and converts the broadcast frame or multicast frame to a wireless LAN frame (802.11 frame); tunnel creation management section 503 that forms a data link layer header (tunnel header) whose destination MAC address is a broadcast address or multicast address and encapsulates the wireless LAN frame with the data link layer header; and terminal side input/output section 505 that transmits the frame formed at tunnel creation management section 503.

Tunnel creation management section 503 adds the identification information (tunnel group identifier) of the virtual LAN formed between AP control apparatus 500 and wireless LAN base station apparatus 600 according to the network identification information (network identifier) of the network through which a broadcast frame is transmitted to the data link layer header (tunnel header).

By so doing, when a broadcast frame is transmitted in downlink, AP control apparatus 500 need not create a unicast frame for each destination, and need only transmit the broadcast frame in virtual LAN units, so that it is possible to reduce the amount of processing at AP control apparatus 500. Moreover, by associating the network identifier of the network system with the tunnel group identifier, it is determined to which virtual LAN the frame is transmitted according to the network system through which the broadcast frame is transmitted, so that AP control apparatus 500 can reduce the amount of processing.

Furthermore, according to Embodiment 2, wireless LAN base station apparatus 600 is provided with: tunnel creation management section 602 that adds a BSSID assigned to wireless LAN base station apparatus 600 to the header part (for example, 802.11 header) of the wireless LAN frame obtained by removing the tunnel header from the frame transmitted from AP control apparatus 500 to which a data link layer header (tunnel header) whose destination MAC address is a broadcast address or a multicast address is added; and terminal side input/output section 604 that transmits the wireless LAN frame with the BSSID added to the header part thereof.

Moreover, tunnel creation management section 602 adds a BSSID according to the virtual LAN identification information added to the received frame.

By so doing, the frame can be transmitted only to the communication terminal to which the BSSID corresponding to the virtual LAN through which the frame is transmitted is assigned.

Other Embodiments (1) Embodiment 1 and Embodiment 2 have explained the case where, in a communication system configured with an AP control apparatus and a wireless LAN base station apparatus, the AP control apparatus and the wireless LAN base station apparatus are directly connected together in a data link layer. However, the present invention is not limited to this, and the AP control apparatus and the wireless LAN base station apparatus may also be connected via several routers, that is, in a network layer.

In this case, the frame conversion section of the AP control apparatus forms a wireless LAN header (for example, 802.11 header) based on the header of the data link layer (network side tunnel header) of the received downlink broadcast frame or multicast frame and converts the broadcast frame or multicast frame to a wireless LAN frame (802.11 frame), the tunnel creation management section forms a network layer header whose destination MAC address is a broadcast address or a multicast address, encapsulates the wireless LAN frame with the network layer header, and the terminal side input/output section transmits the frame formed at the tunnel creation management section.

On the other hand, the tunnel creation management section of the wireless LAN base station apparatus adds a BSSID assigned to the wireless LAN base station apparatus to the wireless LAN frame obtained by removing the header added to the wireless LAN frame from the received frame, and the terminal side input/output section transmits the wireless LAN frame with the BSSID added to the header part thereof.

Furthermore, the router between the AP control apparatus and the wireless LAN base station apparatus may also be a router which performs MPLS (Multi Protocol Label Switching). In this case, the frame conversion section of the AP control apparatus forms a wireless LAN header (for example, 802.11 header) based on the header (network side tunnel header) of the data link layer of the received downlink broadcast frame or multicast frame and converts the broadcast frame or multicast frame to a wireless LAN frame (802.11 frame), the tunnel creation management section forms a label to be broadcast or multicast, encapsulates the wireless LAN frame with the label, and the terminal side input/output section transmits the frame formed at the tunnel creation management section.

On the other hand, the tunnel creation management section of the wireless LAN base station apparatus adds the BSSID assigned to the wireless LAN base station apparatus to the wireless LAN frame obtained by removing the label added to the wireless LAN frame from the received frame, and the terminal side input/output section transmits the wireless LAN frame with the BSSID added to the header part thereof.

Point is that it is only necessary at the tunnel creation management section of the AP control apparatus to form a "transmission header" (this "transmission header" also includes a label in MPLS) required to transmit a downlink broadcast or multicast toward the wireless LAN base station apparatus from the AP control apparatus. The destination MAC address and the IP address or the label of this "transmission header" may be assumed to be broadcast or multicast.

The tunnel creation management section of the wireless LAN base station apparatus may add the BSSID assigned to the wireless LAN base station apparatus to the header part of the wireless LAN frame obtained by removing the "transmission header" added to the wireless LAN frame from the received frame.

(2) Embodiment 2 has explained the case where, in the communication system configured with the AP control apparatus and wireless LAN base station apparatus, the AP control apparatus and the wireless LAN base station apparatus are directly connected together in a data link layer, and data tunnels formed in the data link layer are grouped according to tunnel group identifiers to form a virtual LAN which is one of "virtual networks." However, the present invention is not limited to this, and, when the AP control apparatus and the wireless LAN base station apparatus are connected by a router which performs MPLS (Multi Protocol Label Switching) in the communication system configured with the AP control apparatus and wireless LAN base station apparatus, it is possible to group paths (routes through which frames forwarded by MPLS pass) using labels, and form a "virtual network" made up of a plurality of paths.

In this case, the frame conversion section of the AP control apparatus forms a wireless LAN header (for example, 802.11 header) based on the header (network side tunnel header) of the data link layer of the received downlink broadcast frame or multicast frame and converts the broadcast frame or multicast frame to a wireless LAN frame (802.11 frame), the tunnel creation management section forms a label to be broadcast or multicast and encapsulates the wireless LAN frame with the label, and the terminal side input/output section transmits the frame formed at the tunnel creation management section. The tunnel creation management section then adds "identification information of a virtual network" formed between the AP control apparatus and the wireless LAN base station apparatus according to the network identification information (network identifier) of the network through which the broadcast frame or the multicast frame is transmitted, to the label.

On the other hand, the tunnel creation management section of the wireless LAN base station apparatus adds a BSSID assigned to the wireless LAN base station apparatus to the wireless LAN frame obtained by removing the label added to the wireless LAN frame from the received frame, and the terminal side input/output section transmits the wireless LAN frame with the BSSID added to the header part thereof. Moreover, the tunnel creation management section adds a BSSID according to "virtual network identification information" added to the received frame.

The network to which the above-described virtual LAN and MPLS are applied is an example of "virtual network" and is not particularly limited to these two.

A first aspect of the communication system of the present invention adopts a configuration provided with: a wireless LAN base station control apparatus including: a frame conversion section that forms a wireless LAN header based on a header of a data link layer of a received downlink broadcast frame or multicast frame and converts the broadcast frame or multicast frame to a wireless LAN frame; a frame formation section that forms a transmission header whose destination address is a broadcast address or multicast address and encapsulates the wireless LAN frame with the transmission header; and a transmission section that transmits the frame formed by the frame formation section; and a wireless LAN base station apparatus including: a header modification section that adds a BSSID assigned to the wireless LAN base station apparatus to a header part of the wireless LAN frame obtained by removing the transmission header from the received frame; and a wireless LAN frame transmission section that transmits the wireless LAN frame with the BSSID added to the header part.

According to this configuration, when receiving a broadcast frame, the wireless LAN base station control apparatus need not carry out processing such as making the same number of copies of the frame as wireless LAN base station apparatuses under the wireless LAN base station control apparatus as in the conventional case, and the wireless LAN base station control apparatus need only transmit one broadcast frame whose destination address of the transmission header is a broadcast address, so that it is possible to reduce the amount of processing of the wireless LAN base station control apparatus. On the other hand, the conventional wireless LAN base station apparatus transmits a wireless LAN frame by only removing the header of the frame received from the wireless LAN base station control apparatus, and therefore the amount of processing of the wireless LAN base station apparatus increases by the corresponding amount necessary for adding a BSSID assigned to the wireless LAN base station apparatus to the wireless LAN header compared to the conventional wireless LAN base station apparatus. However, when making copies of the frame carried out by the conventional wireless LAN base station control apparatus is compared with the addition of the BSSID carried out by the wireless LAN base station apparatus, the amount of processing of adding the BSSID is much less, and therefore the overall load on the system decreases considerably compared to the conventional system. Therefore, when a broadcast frame or a multicast frame is communicated in downlink, it is possible to realize a communication system capable of efficient communication.

A second aspect of the communication system of the present invention adopts a configuration, wherein the frame formation section adds identification information of a virtual network formed between the wireless LAN base station control apparatus and the wireless LAN base station apparatus to the transmission header according to network identification information of a network through which the broadcast frame is transmitted.

According to this configuration, when a broadcast or multicast frame is transmitted in downlink, the wireless LAN base station control apparatus need not create a unicast frame for each destination and need only transmit a broadcast frame or a multicast frame in virtual network units, so that it is possible to reduce the amount of processing at the wireless LAN base station control apparatus. Moreover, by associating the network identifier of the network with virtual network identification information, it is determined to which virtual network to transmit the frame according to the network through which the broadcast frame or the multicast frame is transmitted, so that the wireless LAN base station control apparatus can reduce the amount of processing.

A third aspect of the communication system of the present invention adopts a configuration, wherein the header modification section adds the BSSID according to the virtual network identification information added to the received frame.

According to this configuration, the frame can be transmitted only to the communication terminal to which a BSSID corresponding to the virtual network through which the frame is transmitted is assigned.

A first aspect of the wireless LAN base station control apparatus of the present invention adopts a configuration including: a frame conversion section that forms a wireless LAN header based on a header of a data link layer of a received downlink broadcast frame or multicast frame and converts the broadcast frame or multicast frame to a wireless LAN frame; a frame formation section that forms a transmission header whose destination address is a broadcast address or a multicast address and encapsulates the wireless LAN frame with the transmission header; and a transmission section that transmits the frame formed by the frame formation section.

According to this configuration, when a broadcast frame or a multicast frame is received, it is not necessary to carry out processing such as making the same number of copies of the frame as wireless LAN base station apparatuses under the wireless LAN base station control apparatus as in the conventional case, and it is only necessary to transmit one broadcast frame whose destination address of the transmission header is a broadcast address or one multicast frame whose destination address of the transmission header is a multicast address, so that it is possible to reduce the amount of processing and realize a wireless LAN base station control apparatus capable of efficient communication when a broadcast frame or a multicast frame is communicated in downlink.

A second aspect of the wireless LAN base station control apparatus of the present invention adopts a configuration, wherein the frame formation section does not add any BSSID to the wireless LAN header.

According to this configuration, the wireless LAN base station control apparatus need not add any BSSID as in the conventional case, so that it is possible to further reduce the amount of processing.

A third aspect of the wireless LAN base station control apparatus of the present invention adopts a configuration, wherein the frame formation section adds identification information of a virtual network formed with the wireless LAN base station apparatus to the transmission header according to network identification information of a network through which the broadcast frame is transmitted.

According to this configuration, when a broadcast frame is transmitted in downlink, the wireless LAN base station control apparatus need not create a unicast frame for each destination and need only transmit the broadcast frame in virtual network units, so that it is possible to reduce the amount of processing at the wireless LAN base station control apparatus. Moreover, by associating the network identifier of the network with the virtual network identification information, it is determined to which virtual network the frame is transmitted according to the network through which the broadcast frame is transmitted, so that the wireless LAN base station control apparatus can reduce the amount of processing.

A first aspect of the wireless LAN base station apparatus of the present invention adopts a configuration including: a header modification section that adds a BSSID assigned to the wireless LAN base station apparatus to a header part of a wireless LAN frame obtained by removing a transmission header from the frame transmitted from a wireless LAN base station control apparatus to which the transmission header whose destination address is a broadcast address or a multicast address is added; and a wireless LAN frame transmission section that transmits the wireless LAN frame with the BSSID added to the header part.

According to this configuration, the conventional wireless LAN base station apparatus transmits a wireless LAN frame by only removing the header of the frame received from the wireless LAN base station control apparatus, and therefore the amount of processing of the wireless LAN base station apparatus increases compared to the conventional wireless LAN base station apparatus by the corresponding amount necessary for adding the BSSID assigned to the wireless LAN base station apparatus to the wireless LAN header. However, the wireless LAN base station apparatus carries out processing of adding the BSSID and thereby eliminates the necessity for making copies of the frame carried out by the conventional wireless LAN base station control apparatus so that it is possible to reduce the overall load on the system considerably compared to the conventional system. Therefore, when a broadcast frame or a multicast frame is communicated in downlink, it is possible to realize a wireless LAN base station apparatus capable of efficient communication.

A second aspect of the wireless LAN base station apparatus of the present invention adopts a configuration, wherein the header modification section adds the BSSID according to the virtual network identification information added to the received frame.

According to this configuration, the frame can be transmitted only to the communication terminal to which the BSSID corresponding to the virtual network through which the frame is transmitted is assigned.

The invention claimed is:

1. A communication system comprising:
a wireless local area network (LAN) base station controller;
a wireless LAN base station apparatus; and
a wireless LAN terminal, wherein:
the wireless LAN base station controller receives a downlink broadcast frame or multicast frame and transmits, to the wireless LAN base station apparatus, a first frame having a wireless LAN frame and a transmission header that is used between the wireless LAN base station controller and the wireless LAN base station apparatus, and the wireless LAN base station apparatus transmits, to the wireless LAN terminal, the wireless LAN frame with a basic service set identifier (BSSID), wherein:
the wireless LAN base station controller comprises:
a frame conversion section that forms a wireless LAN header based on a header of a data link layer of the downlink broadcast frame or multicast frame and converts the broadcast frame or multicast frame to the wireless LAN frame using the wireless LAN header;
a frame formation section that forms the transmission header whose destination address is a broadcast address or a multicast address and encapsulates the wireless LAN frame by the transmission header; and
a transmission section that transmits the first frame including the wireless LAN frame encapsulated by the transmission header; and
the wireless LAN base station apparatus comprises:
a header modification section that removes the transmission header and adds the BSSID assigned to the wireless LAN base station apparatus to a header part of the wireless LAN frame transmitted from the wireless LAN base station controller; and
a wireless LAN frame transmission section that transmits the wireless LAN frame with the BSSID added to the header part by the header modification section.

2. The communication system according to claim 1, wherein the frame formation section adds identification information of a virtual network formed between the wireless LAN base station controller and the wireless LAN base station apparatus to the transmission header according to network identification information of a network through which the broadcast frame is transmitted.

3. The communication system according to claim 2, wherein the header modification section adds the BSSID according to the virtual network identification information added to the transmission header.

4. A wireless local area network (LAN) base station controller in a communication system comprising the wireless LAN base station controller, a wireless LAN base station apparatus and a wireless LAN terminal, wherein:
the wireless LAN base station controller receives a downlink broadcast frame or multicast frame and transmits, to the wireless LAN base station apparatus, a first frame having a wireless LAN frame and a transmission header that is used between the wireless LAN base station controller and the wireless LAN base station apparatus, and the wireless LAN base station apparatus transmits, to the wireless LAN terminal, the wireless LAN frame with a basic service set identifier (BSSID), the wireless LAN base station controller comprising:
a frame conversion section that forms a wireless LAN header based on a header of a data link layer of the downlink broadcast frame or multicast frame and converts the broadcast frame or multicast frame to the wireless LAN frame;
a frame formation section that forms the transmission header whose destination address is a broadcast address or a multicast address and encapsulates the wireless LAN frame by the transmission header; and
a transmission section that transmits the first frame including the wireless LAN frame encapsulated by the transmission header.

5. The wireless LAN base station controller according to claim 4, wherein the frame formation section adds identification information of a virtual network formed with the wireless LAN base station apparatus to the transmission header according to network identification information of a network through which the broadcast frame is transmitted.

6. A wireless local area network (LAN) base station apparatus in a communication system comprising a wireless LAN base station controller, the wireless LAN base station apparatus and a wireless LAN terminal, wherein:
the wireless LAN base station controller receives a downlink broadcast frame or multicast frame and transmits, to the wireless LAN base station apparatus, a first frame having a wireless LAN frame and a transmission header that is used between the wireless LAN base station controller and the wireless LAN base station apparatus, and the wireless LAN base station apparatus transmits the wireless LAN frame with a basic service set identifier (BSSID) to the wireless LAN terminal, the wireless LAN base station apparatus comprising:
a header modification section that removes the transmission header and adds the BSSID assigned to the wireless LAN base station apparatus to a header part of the wireless LAN frame transmitted from the wireless LAN base station controller; and
a wireless LAN frame transmission section that transmits the wireless LAN frame with the BSSID added to the header part by the header modification section.

7. The wireless LAN base station apparatus according to claim 6, wherein the header modification section adds the BSSID according to a virtual network identification information added to the first frame that is transmitted from the wireless LAN base station controller.

* * * * *